(12) United States Patent
Kim et al.

(10) Patent No.: US 12,645,603 B2
(45) Date of Patent: Jun. 2, 2026

(54) ELECTRONIC DEVICE AND OPERATING METHOD THEREOF

(71) Applicant: SAMSUNG ELECTRONICS CO., LTD., Suwon-si (KR)

(72) Inventors: Moongyung Kim, Suwon-si (KR); Youngsik Eom, Suwon-si (KR); Euiyeon Won, Suwon-si (KR); Donghyeon Ham, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/972,375

(22) Filed: Dec. 6, 2024

(65) Prior Publication Data
US 2025/0328476 A1    Oct. 23, 2025

(30) Foreign Application Priority Data
Apr. 22, 2024    (KR) ........................ 10-2024-0053545

(51) Int. Cl.
*G06F 12/1027* (2016.01)
*G06F 12/1009* (2016.01)

(52) U.S. Cl.
CPC ...... *G06F 12/1027* (2013.01); *G06F 12/1009* (2013.01)

(58) Field of Classification Search
CPC ............. G06F 12/1009; G06F 12/1027; G06F 12/1036; G06F 2212/1024; G06F 2212/681; G06F 2212/68
See application file for complete search history.

(56) References Cited

U.S. PATENT DOCUMENTS

| | | | |
|---|---|---|---|
| 6,105,113 A | 8/2000 | Schimmel | |
| 6,510,508 B1 | 1/2003 | Zuraski, Jr. et al. | |
| 8,589,629 B2 | 11/2013 | Owen et al. | |
| 9,009,446 B2 | 4/2015 | Koka et al. | |
| 9,081,706 B2 | 7/2015 | Koka et al. | |
| 9,092,358 B2 | 7/2015 | Rychlik et al. | |
| 9,411,745 B2 | 8/2016 | Shen et al. | |
| 9,524,232 B2 | 12/2016 | Bhattacharjee et al. | |
| 9,892,058 B2 | 2/2018 | Wilkes | |
| 10,120,809 B2 | 11/2018 | Arellano et al. | |
| 10,296,465 B2 | 5/2019 | John et al. | |
| 10,437,739 B2 | 10/2019 | Gopal | |

(Continued)

FOREIGN PATENT DOCUMENTS

| | | |
|---|---|---|
| CN | 1436332 A | 8/2003 |
| KR | 10-2011-0134917 A | 12/2011 |
| KR | 10-2015-0138399 A | 12/2015 |

*Primary Examiner* — Jane W Benner
(74) *Attorney, Agent, or Firm* — Sughrue Mion, PLLC

(57)    ABSTRACT
An electronic device may include: a processor including a first core and a second core, the first core and the second core being configured to execute a process; and a main memory configured to store a page table corresponding to the process. The first core includes: a first translation lookaside buffer (TLB) configured to store a first portion of the page table; a page table walker configured to perform a page table walk operation to look up the page table; and a TLB check predictor configured to store a check weight table and, based on the check weight table, transmit a TLB check request to the second core. The second core includes a second TLB configured to store a second portion of the page table.

14 Claims, 19 Drawing Sheets

(56) References Cited

U.S. PATENT DOCUMENTS

| | | | |
|---|---|---|---|
| 10,747,712 B1 | 8/2020 | Agarwal | |
| 10,795,823 B2 | 10/2020 | Ramanujan et al. | |
| 11,507,516 B2 | 11/2022 | Roberts et al. | |
| 11,656,997 B2 | 5/2023 | Gholkar et al. | |
| 2010/0235586 A1* | 9/2010 | Gonion | G06F 12/0831 |
| | | | 711/146 |
| 2019/0243780 A1* | 8/2019 | Gopal | G06F 12/0811 |
| 2024/0385966 A1* | 11/2024 | Li | G06F 12/0862 |
| 2025/0199964 A1* | 6/2025 | Maidee | G06F 12/1027 |

* cited by examiner

| VIRTUAL PAGE NUMBER | PHYSICAL FRAME NUMBER |
|---|---|
| VPN_1 | PFN_1 |
| VPN_2 | PFN_2 |
| VPN_3 | PFN_3 |
| ... | ... |
| VPN_10 | PFN_10 |

111_2

| VIRTUAL PAGE NUMBER | PHYSICAL FRAME NUMBER |
|---|---|
| VPN_11 | PFN_11 |
| VPN_12 | PFN_12 |
| VPN_13 | PFN_13 |
| ... | ... |
| VPN_20 | PFN_20 |

| VIRTUAL ADDRESS | CHECK WEIGHT VALUE |
|:---:|:---:|
| VA_1 | 1 |
| VA_2 | 2 |
| VA_3 | 3 |
| ... | ... |
| VA_10 | 4 |

ELECTRONIC DEVICE AND OPERATING METHOD THEREOF

CROSS-REFERENCE TO RELATED APPLICATION

This application is based on and claims priority under 35 U.S.C. § 119 to Korean Patent Application No. 10-2024-0053545, filed on Apr. 22, 2024, in the Korean Intellectual Property Office, the disclosure of which is incorporated by reference herein in its entirety.

BACKGROUND

1. Field

The disclosure relates to an electronic device. More specifically, the disclosure relates to an electronic device configured to share address translation information between cores and an operating method of the electronic device.

2. Description of Related Art

A computer system may be configured to provide an address space greater than a physical memory by using a memory management method called virtual memory. A processor may be configured to execute a plurality of processes, and in this case, each of the plurality of processes may have an independent virtual address space managed by an operating system. A virtual address space may indicate a group of virtual addresses corresponding to the plurality of processes. On the other hand, a physical address may refer to an address indicating an actual position in a main memory. A physical address is needed for a processor to directly interact with the main memory. For a processor to store data in the main memory or access data stored in the main memory, a virtual address may be translated into a physical address.

A series of processes to translate a virtual address into a physical address may be executed by a memory management unit (MMU) included in the processor. The MMU may be configured to translate the virtual address into a physical address by using a page table and a translation lookaside buffer (TLB). The page table may indicate a mapping table for mapping the virtual address and the physical address of the process. The TLB may indicate hardware configured to cache a portion of the page table and included in the processor to more rapidly perform such an address translation operation.

When the processor generates a memory access request based on the virtual address to execute the processes, the MMU may first look up a translation index buffer. When the virtual address is in the TLB (TLB hit), the virtual address may be immediately translated into a physical address corresponding to the virtual address. When the virtual address is not in the TLB (a TLB miss), the MMU may perform address translation by looking up the page table.

In a multi-core processor including a plurality of cores, the plurality of cores may respectively include TLBs. However, translation information stored in each of the TLBs is not shared between the plurality of cores.

SUMMARY

The disclosure may improve the performance of a multi-core processor by sharing address translation information among cores.

Technical goals of the disclosure are not limited thereto, and other unmentioned technical goals may be clearly understood to those skilled in the art from the following descriptions.

According to one or more example embodiments, an electronic device may include: a processor including a first core and a second core, the first core and the second core being configured to execute a process; and a main memory configured to store a page table corresponding to the process. The first core includes: a first translation lookaside buffer (TLB) configured to store a first portion of the page table; a page table walker configured to perform a page table walk operation to look up the page table; and a TLB check predictor configured to store a check weight table and, based on the check weight table, transmit a TLB check request to the second core. The second core includes a second TLB configured to store a second portion of the page table. The first core is configured to translate a virtual address of the process into a physical address, based on a result of the page table walk operation and a TLB check response received from the second core. The check weight table includes the virtual address and a check weight value corresponding to the virtual address.

According to one or more example embodiments, an operating method of an electronic device including a first core, a second core, and a main memory configured to execute processes, wherein the main memory comprises a page table, the first core comprises a first TLB configured to store a first portion of the page table, and the second core comprises a second TLB may include a second portion of the page table. The operating method may include: looking up the first TLB, performed by the first core, based on a virtual address of a process; looking up the page table, based on a result of the looking up the first TLB, by the first core; performing an operation of looking up the second TLB, based on the result of the looking up the first TLB and a check weight table; and translating the virtual address into a physical address, based on a result of the looking up the page table and a TLB check response received from the second core, by the first core, wherein the check weight table comprises the virtual address and a check weight value corresponding to the virtual address.

According to one or more example embodiments, an electronic device may include: a processor including a first core and a second core, the first core and the second core being configured to execute a process; and a main memory configured to store a page table corresponding to the process. The first core may include a first translation lookaside buffer (TLB) configured to store a first portion of the page table; a first page table walker configured to perform a first page table walk operation of looking up the page table; a TLB check predictor configured to transmit a TLB check request and a walk cache check request to the second core; and a first walk cache configured to store intermediate translation values extracted as the first page table walker performs the first page table walk operation. The second core may include: a second TLB configured to store a second portion of the page table; a second page table walker configured to perform a second page table walk operation of looking up the page table; and a second walk cache configured to store intermediate translation values extracted as the second page table walker performs the second page table walk operation. The first core may be further configured to translate a virtual address of the process into a physical address, based on a TLB check response and a walk cache check response received from the second core as a result of the second page table walk operation.

According to one or more example embodiments, an electronic device may include: at least one processor may include a first core and a second core; at least one memory configured to store a page table and instructions which, when executed by the at least one processor, cause the first core to: access a first memory address by checking a first translation look-aside buffer (TLB) associated with the first core for the first memory address; based on a failure of the checking the first TLB, check a second TLB associated with the second core for the first memory address; based on a failure of the checking the second TLB, access the first memory address by walking the page table; and execute a process using information accessed from the first memory address.

BRIEF DESCRIPTION OF THE DRAWINGS

Embodiments will be more clearly understood from the following detailed description taken in conjunction with the accompanying drawings in which:

FIG. 4 is a diagram for describing a translation lookaside buffer according to one or more embodiments;

FIG. 5 is a diagram for describing a check weight table according to one or more embodiments;

DETAILED DESCRIPTION

Figure 1:
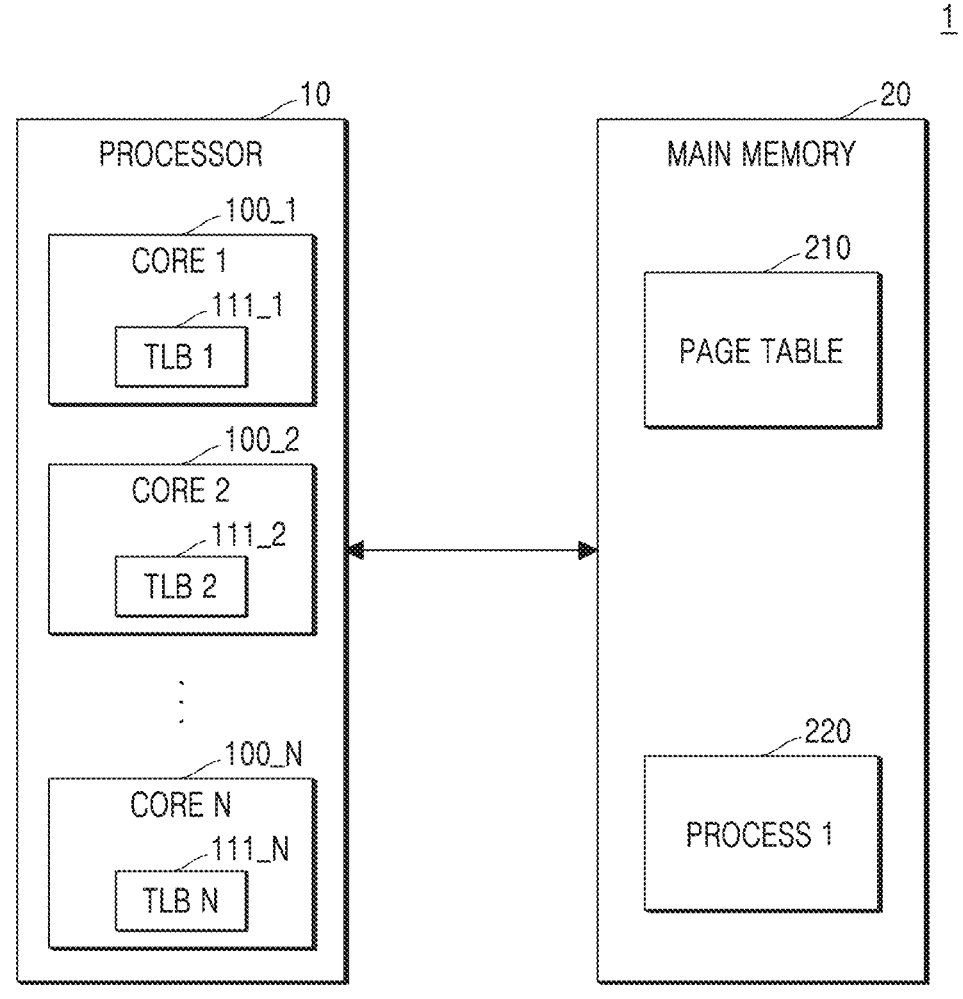
FIG. 1 is a block diagram of an electronic device according to embodiments.

Hereinafter, embodiments will be described in detail with reference to the accompanying drawings. In the descriptions with reference to the drawings, same reference numerals will be used for same or corresponding components, and repeated descriptions will not be given.

FIG. 1 is a block diagram of an electronic device 1 according to embodiments.

Referring to FIG. 1, the electronic device 1 according to one or more embodiments may be included in a mobile device, e.g., a smartphone or a wearable device, and in this case, the electronic device 1 may be implemented as an application processor (AP) or a System-On-a-Chip (SoC). However, the electronic device 1 is not limited thereto and may be included in a computing device, e.g., a personal computer (PC), a neural implant, a tablet PC, and a server.

The electronic device 1 may include a processor 10 and a main memory 20.

The processor 10 may include a device configured to process data, e.g., a central processing unit (CPU), a neural processing unit (NPU), a graphics processing unit (GPU), an application processor (AP). The processor 10 may be configured to execute an operating system (OS) and/or various types of applications. The processor 10 may be configured to transmit, to the main memory 20, a transaction for requesting to perform a certain operation. The processor 10 may be configured to receive an answer for the transaction from the main memory 20. For example, the processor 10 may be configured to transmit, to the main memory 20, a transaction including a read request and an address, and the main memory 20 may be configured read data stored in a memory region corresponding to the address. However, the processor 10 is not limited thereto.

The processor 10 may be configured to control general operations of the electronic device 1. In one or more embodiments, the processor 10 may include a CPU. The processor 10 may include a multi-core processor including a first core 100_1 to an Nth core 100_N (where N is a natural number of 2 or greater).

In one or more embodiments, the first core 100_1 to the Nth core 100_N may include heterogeneous cores. For example, the processor 10 may include a processor designed according to ARM big.LITTLE heterogeneous processing architecture. The first core 100_1 to the Nth core 100_N may include cores configured to provide relatively high performance and high power consumption (may be referred to as big cores in the present specification) and cores configured to provide relatively low performance and low power consumption (may be referred to as little cores in the present specification). Accordingly, the heterogeneous cores may be respectively configured to provide different performances (e.g., a time period of execution, power consumption) while performing a same task.

In one or more embodiments, a first process 220 may include at least one thread. That is, the first process 220 may include a single thread process, and may also include a multi-thread process. In the present specification, for convenience of explanation, descriptions will be given under assumption that the first process 220 includes a single thread process. However, the embodiment is not limited thereto.

In one or more embodiments, the processor 10 may be configured to execute the first process 220 by using at least one of the first core 100_1 to the Nth core 100_N. In the present specification, execution of the first process 220 may be used as a same meaning as execution of a thread of the first processor 200. The processor 10 may be configured to shift a process or a thread, which is being executed in any one core, to be executed in another core, and such an operation may be referred to as migration in the present specification. For example, when the first core 100_1 includes a big core and the second core 100_2 includes a little core, when higher performance is required to execute a thread of the first process 220, the processor 10 may be configured to migrate a thread, which is being executed in the second core 100_2, to the first core 100_1. On the other hand, when no more high performance is needed to execute the thread of the first process 220, the processor 10 may be configured to migrate a thread, which is being executed in the first core 100_1, to the second core 100_2.

The main memory 20 may be configured to store data used by the processor 10. The main memory 20 may include volatile memory devices including a Static Random Access Memory (SRAM), a Dynamic Random Access Memory (DRAM), and the like. However, the disclosure is not limited thereto, and the main memory 20 may include arbitrary types of nonvolatile memory devices to which the processor 10 may access, e.g., a flash memory, a Phase-change Random Access Memory (PRAM), Magnetic Random Access Memory (MRAM), Ferroelectric Random Access Memory (FeRAM), and the like.

The main memory 20 may be accessed by the first core 100_1 to the Nth core 100_N, and may be configured to store software elements executable by the first core 100_1 to the Nth core 100_N. For example, as shown in FIG. 1, the main memory 20 may be configured to store a page table 210 and the first process 220. In detail, the processor 10 may be configured to load the first process 220 to the main memory 20 by executing programs stored in a storage media (e.g., a solid state drive (SSD), a hard disk drive (HDD), and the like), thereby storing the first process 220 in the main memory 20. In a process where the processor 10 executes the first process 220, the page table 210 corresponding to the first process 220 may also be stored in the main memory 20. In the present specification, as non-limited examples, the software element may include software components, programs, applications, computer programs, application programs, system programs, software development programs, machine programs, operating systems (OS), software, middleware, firmware, software modules, routines, subroutines, functions, methods, procedures, software interfaces, application program interfaces (API), instruction sets, computing codes, computer codes, code segments, computer code segments, words, values, symbols, or combinations of at least two of the aforementioned examples.

The page table 210 may include page table entries in which virtual addresses and physical addresses (i.e. memory addresses) corresponding to the first process 220 are mapped by the processor 10. In one or more embodiments, the page table 210 may include a four-level page table. The four-level page table will be described later with reference to FIG. 10. In the present specification, the virtual address and the physical address may have different lengths. For example, the virtual address may include forty-eight bits, and the physical address may include forty bits.

The first core 100_1 to the Nth core 100_N may respectively include a first translation lookaside buffer (TLB) 111_1 to a Nth TLB 111_N. The first TLB 111_1 to the Nth TLB 111_N may each be configured to cache a portion of the page table 210.

The first TLB 111_1 to the Nth TLB 111_N may respectively cache different information. For example, it is assumed that the first process 220 being executed in the second core 100_2 is migrated to the first core 100_1. According to one or more embodiments, when the first core 100_1 executes the first process 220, the first core 100_1 may be configured to perform an address translation operation by using address translation information provided from the second TLB 111_2 included in the second core 100_2 as well as the first TLB 111_1 included in the first core 100_1. According to the embodiments, by sharing the address translation information among the cores, the performance of the processor 10 may be improved. In the present specification, translating the virtual address into the physical address may indicate generating the physical address based on the virtual address.

Figure 2:
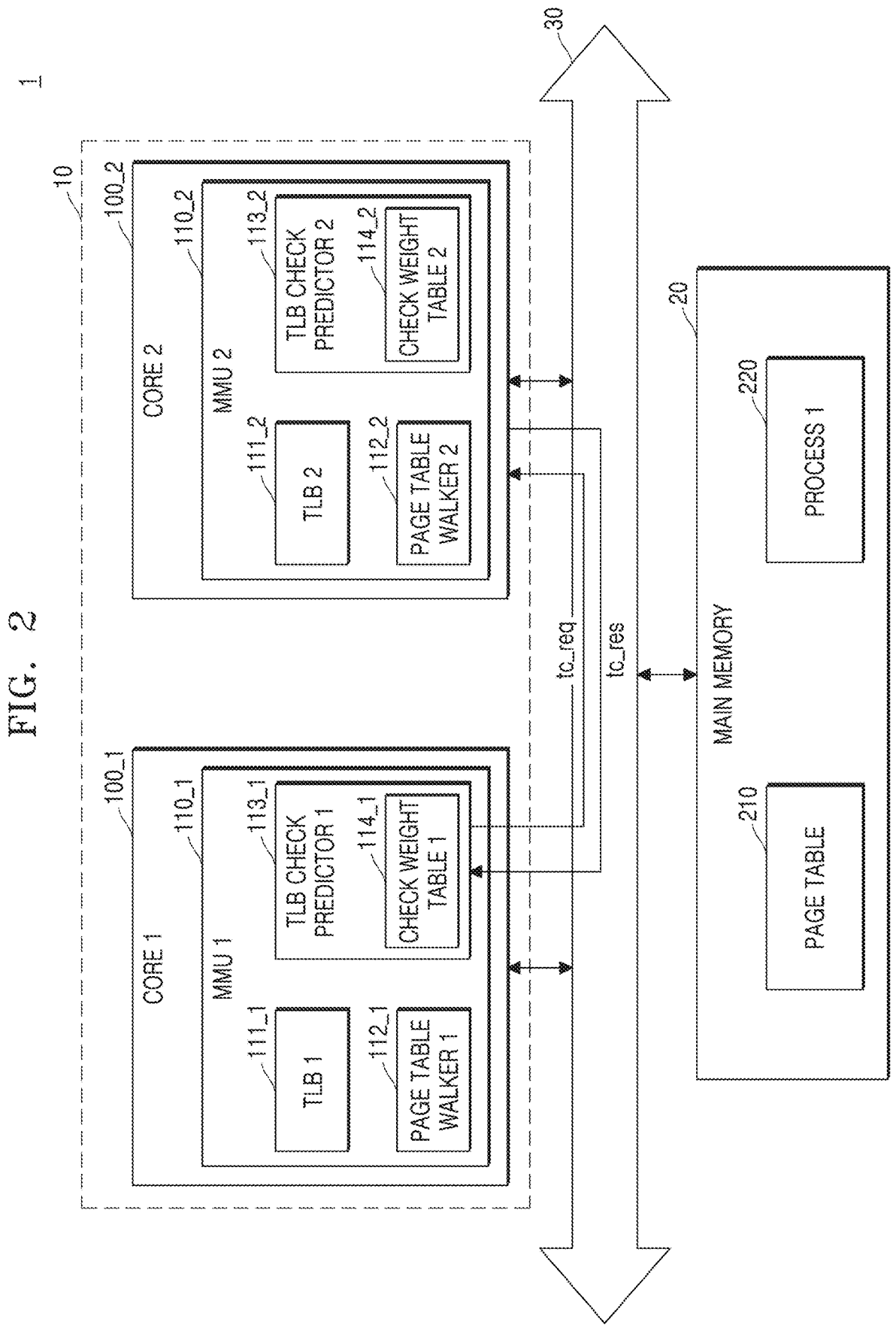
FIG. 2 is a block diagram of an electronic device according to embodiments.

FIG. 2 is a block diagram of the electronic device 1 according to embodiments. FIG. 2 may be described with reference to FIG. 1, and repeated descriptions may be omitted.

Referring to FIG. 2, the electronic device 1 may include the processor 10, the main memory 20, and a coherent interconnect 30.

The processor 10 may include the first core 100_1 and the second core 100_2. The description that the processor 10 includes two cores is merely an example for description, and is not to limit the disclosure.

The first core 100_1 may include a first memory management unit (MMU) 110_1. The first MMU 110_1 may be configured to translate the virtual address, which is generated by the first core 100_1 to execute the first process 220, into the physical address. In the present specification, the series of operations related to the address translation performed by the first core 100_1 may be performed through the first MMU 110_1.

The first MMU 110_1 may include the first TLB 111_1, a first page table walker 112_1, and a first TLB predictor 113_1. The first TLB 111_1 may be configured to store a portion of information stored in the page table 210.

The first page table walker 112_1 may be configured to look up the page table 210. In the present specification, an operation of the first page table walker 112_1 to look up the page table 210 may be referred to as a page table walk operation.

In one or more embodiments, when a physical address corresponding to a target virtual address is not in the first TLB 111_1, the first page table walker 112_1 may access the main memory 20 and perform the page table walk operation on the page table 210. The first page table walker 112_1 may be configured to obtain the physical address corresponding to the target virtual address through the page table walk operation on the page table 210.

In the present specification, a virtual address, which is a target to be translated into the physical address by the MMU, may be referred to as the target virtual address. The physical address corresponding to the target virtual address may be referred to as a target physical address. In addition, in the present specification, the virtual address and a logical address may be used as same meaning. In the present specification, when the physical address corresponding to the target virtual address is in the TLB, a result of looking up by the MMU may be referred to as a TLB hit. On the other hand, when the physical address corresponding to the target virtual address is not in the TLB, a result of looking up by the MMU may be referred to as a TLB miss (or failure of a TLB checkm).

In one or more embodiments, the page table walk operation of the first page table walker 112_1 and an operation of the first TLB predictor 113_1 to provide a TLB check request tc_req to the second core 100_2 may be performed in parallel.

The first TLB predictor 113_1 may include a first check weight table 114_1. The first TLB predictor 113_1 may be configured to provide the TLB check request tc_request to the second core 100_2, based on the first check weight table

114_1. Detailed descriptions regarding the check weight table will be given with reference to FIG. 3. The first TLB predictor 113_1 may be configured to receive the TLB check request tc_res from the second core 100_2.

In one or more embodiments, the first MMU 110_1 may be configured to look up the first TLB 111_1 to translate the target virtual address, which is generated by the first core 100_1, into the physical address.

In one or more embodiments, when the physical address corresponding to the target virtual address is in the first TLB 111_1, the first TLB predictor 113_1 may not generate the TLB check request tc_req. The first MMU 110_1 may be configured to translate the target virtual address into the physical address, based on the physical address corresponding to the target virtual address looked up in the first TLB 111_1.

In one or more embodiments, when the physical address corresponding to the target virtual address is not in the first TLB 111_1, the first TLB predictor 113_1 may be configured to generate the TLB check request tc_req. The first TLB predictor 113_1 may be configured to provide the TLB check request tc_req that has been generated to the second core 100_2. When the second core 100_2 receives the TLB check request tc_req from the first TLB predictor 113_1, the second core 100_2 may be configured to look up a second TLB 111_2 through a second MMU 110_2. When a physical address corresponding to a target virtual address is in the second TLB 111_2, the second core 100_2 may be configured to generate a TLB check response tc_res including the physical address corresponding to the target virtual address. The second core 100_2 may be configured to provide the TLB check response tc_res that has been generated to the first TLB predictor 113_1. When the first TLB predictor 113_1 receives the TLB check response tc_res, the first core 100_1 may be configured to translate the target virtual address into the physical address based on the TLB check response tc_res.

When the TLB check response tc_res received by the first core 100_1 is generated in response to occurrence of the TLB heat for the second TLB 111_2, the first core 100_1 may be configured to stop the page table walk operation with respect to the first page table walker 112_1. In other words, as the first core 100_1 has received the physical address corresponding to the target virtual address from the second TLB 111_2 of the second core 100_2, the first core 100_1 may prevent waste of resources of the processor 10 by stopping the page table walk operation.

In one or more embodiments, when the physical address corresponding to the target virtual address is neither in the first TLB 111_1 nor the second TLB 111_2, the second core 100_2 may be configured to generate a TLB check response tc_res including a value indicating a TLB miss. When the TLB check response tc_res received by the first core 100_1 is generated in response to occurrence of the TLB miss for the second TLB 111_2, the first core 100_1 may be configured to continuously perform the page table walk operation of the first page table walker 112_1 without stopping. In other words, the first core 100_1 has not received the physical address corresponding to the target virtual address from the second TLB 111_2 of the second core 100_2, and therefore may obtain the physical address corresponding to the target virtual address by looking up the page table 210 through the page table walk operation. In this case, the first core 100_1 may be configured to translate the target virtual address into the physical address, based on the page table walk operation.

In one or more embodiments, when the first core 100_1 translates the target virtual address into the physical address based on the page table walk operation, a page table entry looked up through the page table walk operation may be added to the first TLB 111_1.

The second core 100_2 may include a second MMU 110_2. The second MMU 110_2 may be configured to convert the virtual address, which is generated by the second core 100_2 to execute the first process 220, into the physical address. In the present specification, the series of operations related to the address translation performed by the second core 100_2 may be performed through the second MMU 110_2. The second MMU 110_2 may include the second TLB 111_2, a first page table walker 112_2, and a second TLB predictor 113_2. The second TLB 111_2 may be configured to store a portion of information stored in the page table 210. Components included in the second core 100_2 may be configured to operate based on same principles as components of the first core 100_1, and repeated descriptions will be omitted.

The coherent interconnect 30 may be configured to electrically connect the first core 100_1, the second core 100_2, and the main memory 20. In some embodiments, the coherent interconnect 30 may be referred to as a cache coherent interconnect.

In one or more embodiments, the electronic device 1 may be configured to maintain data coherence between the first core 100_1 and the second core 100_2 through the coherent interconnect 30.

In one or more embodiments, the coherent interconnect 30 may be implemented as a bus, and for example, the coherent interconnect 30 may be designed based on Advanced Microcontroller Bus Architecture Coherent Hub Interface (AMBA CHI) protocol.

Figure 3:
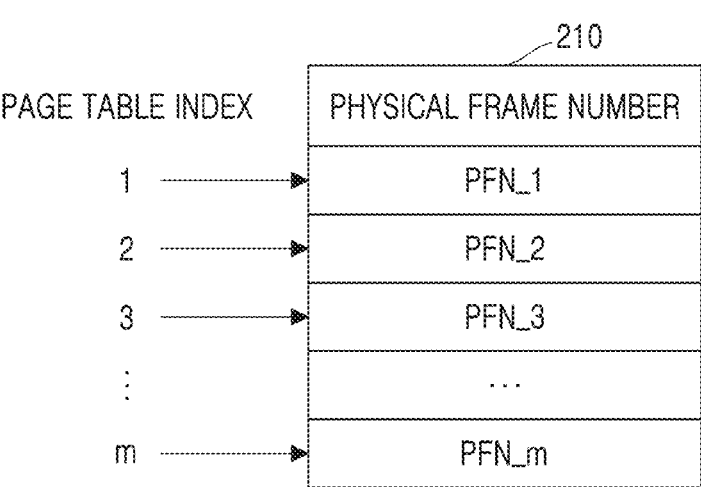
FIG. 3 is a diagram for describing a page table according to one or more embodiments.

FIG. 3 is a diagram for describing the page table 210 according to one or more embodiments. FIG. 3 may be described with reference to FIGS. 1 and 2, and repeated descriptions may be omitted.

In the present specification, a page may indicate a basic unit constructing a virtual memory. A frame may indicate a basic unit constructing a physical memory. In one or more embodiments, a capacity of the page and a capacity of the frame may be identical. For example, the capacity of the page may be 4 KB, and the capacity of the frame may also be 4 KB. In the present specification, it is assumed that physical memory refers to the main memory 20.

Referring to FIG. 3, the page table 210 may include a data structure used for mapping virtual addresses corresponding to the first process 220 to physical addresses. As shown in FIG. 3, the page table 210 may include m (where m is a natural number of 1 or greater) page table entries. The page table entries may be distinguished by page table indices.

In the page table 210, each of the page table entries may include mapping information for a certain virtual page. More particularly, the page table entry may include a physical frame number corresponding to the page table index. The physical frame number may include a number for identifying a certain frame (or a page frame) in the main memory 20.

In one or more embodiments, a virtual address used when the processor 10 executes the first process 220 may be divided into a virtual page number and an offset value. The virtual page number may correspond to the page table index of the page table 210. For example, when the virtual page number of the virtual address is three, the page table index corresponding to the virtual page number may also be three. In this case, the physical frame number of the physical address mapped to the virtual address may include a third physical frame number PFN_3.

FIG. 4 is a diagram for describing the first TLB 111_1 and the second TLB 111_2 according to embodiments. FIG. 4 may be described with reference to FIGS. 1 to 3, and repeated descriptions may be omitted.

Referring to FIG. 4, the first TLB 111_1 may include ten TLB entries. Likewise, the second TLB 111_2 may also include ten TLB entries. The illustration that each of the first TLB 111_1 and the second TLB 111_2 includes ten TLB entries is an example for description, and is not intended to limit the disclosure.

The first TLB 111_1 may include a cache configured to caching the page table 210. That is, the first TLB 111_1 may be configured to store a portion of the page table 210. Each of the TLB entries constructing the first TLB 111_1 may include a pair of a key and a value. For example, the key may indicate a virtual page number, and the value may indicate a physical frame number. The first MMU 110_1 may be configured to look up the first TLB 111_1, based on the target virtual address generated from the first core 100_1. When a virtual page number of the target virtual address is matches the key of the first TLB 111_1, the first MMU 110_1 may return a physical address corresponding to the target virtual number, based on a value (i.e., the physical frame number) corresponding to the key that matches the virtual page number of the target virtual address. The first core 100_1 may be configured to execute the first process 220 based on the physical address that has been returned.

The second TLB 111_2 may also have a configuration similar to the configuration of the first TLB 111_1, and repeated descriptions will be omitted. In one or more embodiments, the TLB entries stored in the first TLB 111_1 and the second TLB 111_2 may be different from each other. For example, as shown in FIG. 4, the first TLB 111_1 may include a first virtual page number VPN_1 to a tenth virtual page number VPN_10 and a first physical frame number PFN_1 to a tenth physical frame number PFN_10. On the other hand, the second TLB 111_2 may be configured to store an eleventh virtual page number VPN_11 to a twentieth virtual page number VPN_20 and an eleventh physical frame number PFN_11 to a twentieth physical frame number PFN_20.

FIG. 5 is a diagram for describing a check weight table according to one or more embodiments. FIG. 5 may be described with reference to FIGS. 1 to 4, and repeated descriptions may be omitted.

Referring to FIGS. 2 and 5, the first check weight table 114_1 may include a first virtual address VA_1 to a tenth virtual address VA_10 and check weight values. A pair of each virtual address and a check weight value corresponding to the virtual address may be referred to as a check weight entry. Although FIG. 5 illustrates that the first check weight table 114_1 includes ten check weight entries, this is only an example for description and is not to limit the disclosure.

The check weight value may include a value for indicating possibility that another core has information for translating the target virtual address into the physical address. The check weight value may have any one of four values. For example, the four values may include values respectively indicating no possibility, low possibility, moderate possibility, and high possibility.

In one or more embodiments, when the check weight value is a first value (e.g., "1"), it may indicate that there is no possibility that a virtual address corresponding to the check weight value is stored in a TLB of another core. When the check weight value is a second value (e.g., "2"), it may indicate that there is low possibility that a virtual address corresponding to the check weight value is stored in a TLB of another core. When the check weight value is a third value (e.g., "3"), it may indicate that there is moderate possibility that a virtual address corresponding to the check weight value is stored in a TLB of another core. When the check weight value is a fourth value (e.g., "4"), it may indicate that there is high possibility that a virtual address corresponding to the check weight value is stored in a TLB of another core.

In one or more embodiments, a situation in which the first core 100_1 translates the target virtual address into the target physical address is assumed. The first core 100_1 may be configured to look up the first TLB 111_1 (see FIG. 2) based on the target virtual address. When a TLB miss occurs as a result of looking up the first TLB 111_1, the first core 100_1 may look up a check weight value corresponding to the target virtual address in the first check weight table 114_1. When the check weight value that has been looked up is a reference value or greater, the first core 100_1 may generate the TLB check request tc_req through the first TLB predictor 113_1 and provide the TLB check request tc_req to the second core 100_2. In other words, when the check weight value that has been looked up is greater than the reference value, the first core 100_1 may transmit the TLB check request tc_req to the second core 100_2 to obtain information for translating the target virtual address into the physical address from the second core 100_2.

When the check weight value that has been looked up is less than the reference value, the first core 100_1 may not generate the TLB check request tc_req through the first TLB predictor 113_1. In other words, when the check weight value that has been looked up is less than the reference value, the first core 100_1 may perform address translation through the page table walk operation by accessing the page table 210 of the main memory 20 without looking up the address translation information stored in the second core 100_2.

In one or more embodiments, when a TLB hit occurs as a result of looking up the second TLB 111_2 by the second core 100_2 in response to the TLB check request tc_req, the first TLB predictor 113_1 may increase the check weight value corresponding to the target virtual address. For example, when the check weight value is the second value, the first TLB predictor 113_1 may increase the check weight value corresponding to the target virtual address up to the third value. When a TLB miss occurs as a result of looking up the second TLB 111_2 (see FIG. 2) by the second core 100_2 in response to the TLB check request tc_req, the first TLB predictor 113_1 may decrease the check weight value corresponding to the target virtual address. For example, when the check weight value is the second value, the first TLB predictor 113_1 may decrease the check weight value corresponding to the target virtual address down to the first value.

In one or more embodiments, the reference value may be variously modified according to embodiments. For example, in a case where the reference value is the second value, when the check weight value corresponding to the target virtual address includes the second value, the third value, and a fourth value, the first TLB predictor 113_1 may generate the TLB check request tc_req. On the other hand, in a case where the reference value is the second value, when the check weight value corresponding to the target virtual address includes the first value, the first TLB predictor 113_1 may not generate the TLB check request tc_req.

In one or more embodiments, a basic value of the check weight value stored in the first check weight table 114_1 may include the third value. For example, it is assumed that the first core 100_1 initially looks up the third virtual address VA_3 in the first check weight table 114_1 to translate the virtual address. In this case, the check weight value corresponding to the third virtual address VA_3 may include the third value.

A second check weight table 114_2 may also include information similar to information included in the first check weight table 114_1. Like the first core 100_1 performs address translation by using the first check weight table 114_1, the second core 100_2 may be configured to perform address translation by using the second check weight table 114_2 (see FIG. 2). Repeated descriptions will be omitted.

Figure 6:
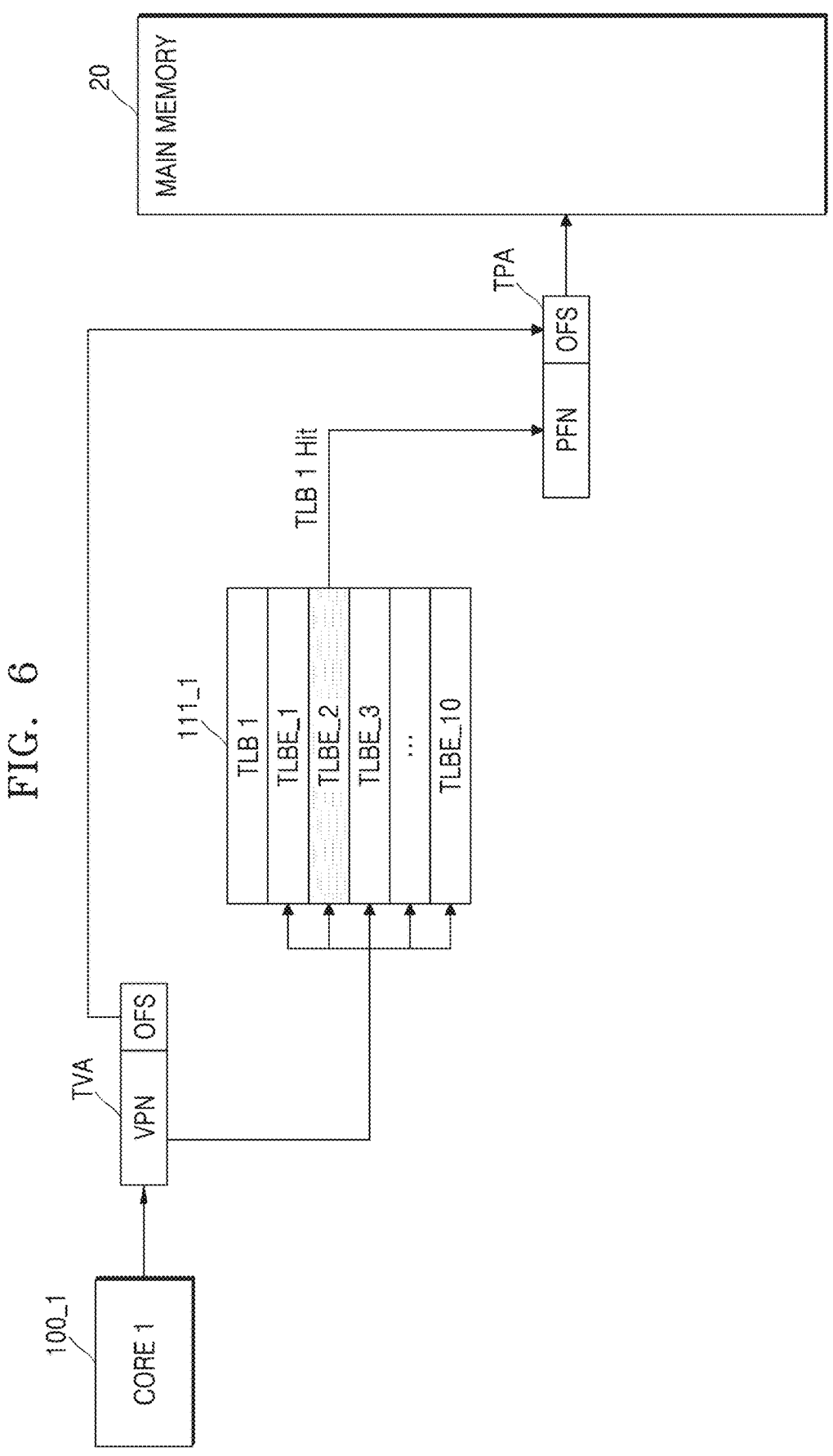
FIG. 6 is a diagram for describing translation of a virtual address into a physical address, according to one or more embodiments.

FIG. 6 is a diagram for describing translation of a virtual address into a physical address, according to one or more embodiments. More particularly, FIG. 6 is a diagram for describing a case in which a TLB hit occurs as a result of looking up the first TLB 111_1 by the first MMU 110_1. FIG. 6 may be described with reference to FIGS. 1 to 5, and repeated descriptions may be omitted.

Referring to FIG. 6, the first core 100_1 may be configured to generate the target virtual address TVA. The target virtual address TVA may be divided into a virtual page number VPN and an offset value OFS. The first core 100_1 may be configured to translate the target virtual address TVA into a target physical address TPA through the first MMU 110_1. The target physical address TPA may be divided into a physical frame number PFN and an offset value OFS. The first MMU 110_1 may be configured to look up the first TLB 111_1 based on the virtual page number VPN of the target virtual address TVA.

In one or more embodiments, it is assumed that a second TLB entry TLBE_2 of the first TLB 111_1 includes a pair of the virtual page number VPN and the physical frame number PFN. In this case, as a result of looking up the first TLB 111_1 by the first MMU 110_1, a TLB hit may occur. The first MMU 110_1 may be configured to extract the physical frame number PFN corresponding to the virtual page number VPN based on the second TLB entry TLBE_2 and extract the offset value OFS from the target virtual address TVA. The first MMU 110_1 may be configured to translate the target virtual address TVA into the target physical address TPA, based on the physical frame number PFN and the offset value OFS those are extracted. The first core 100_1 may be configured to perform a series of operations related to the first process 220 by accessing the main memory 20 based on the target physical address TPA.

Figure 7:
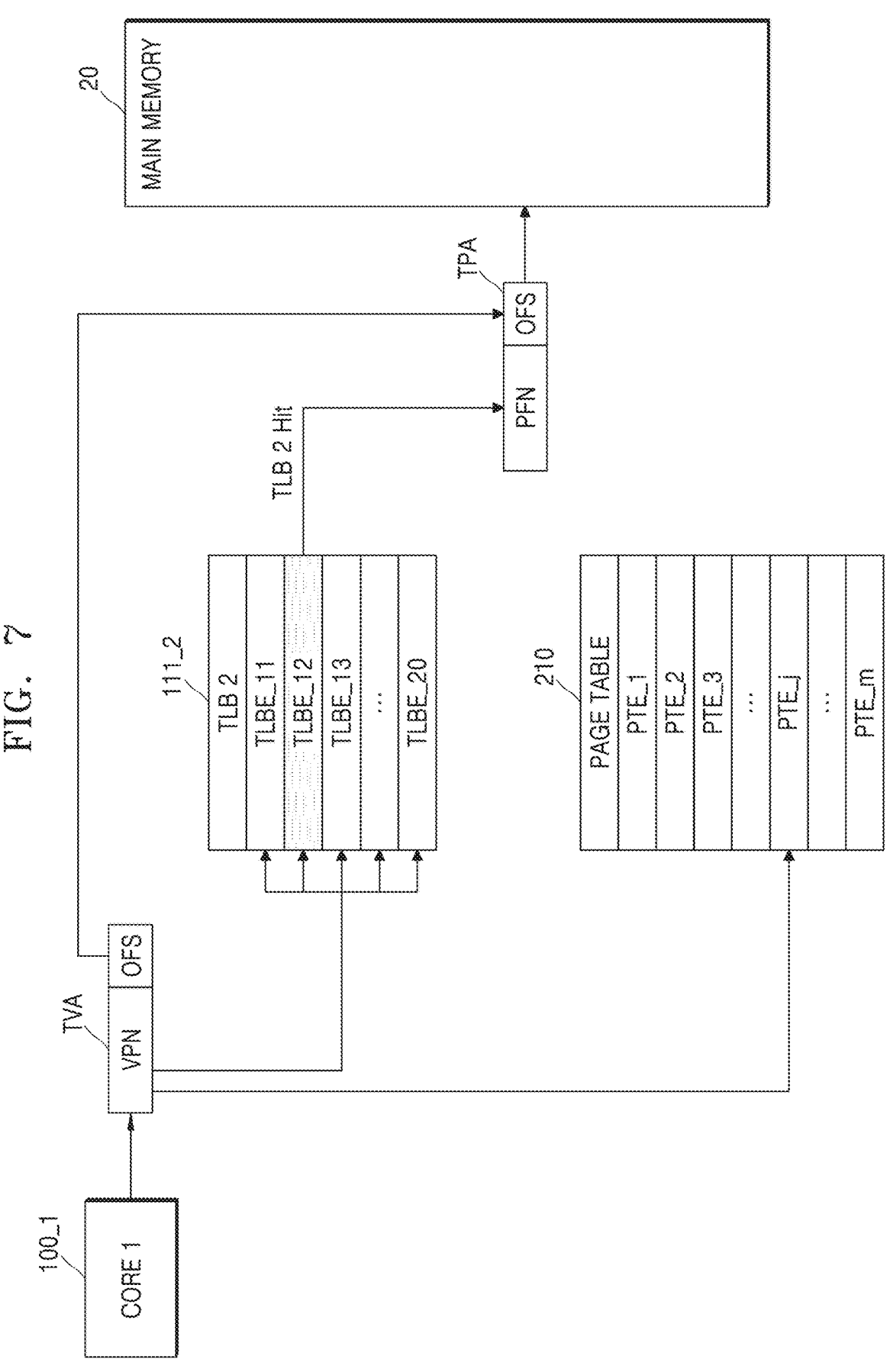
FIG. 7 is a diagram for describing translation of a virtual address into a physical address, according to one or more embodiments.
Figure 8:
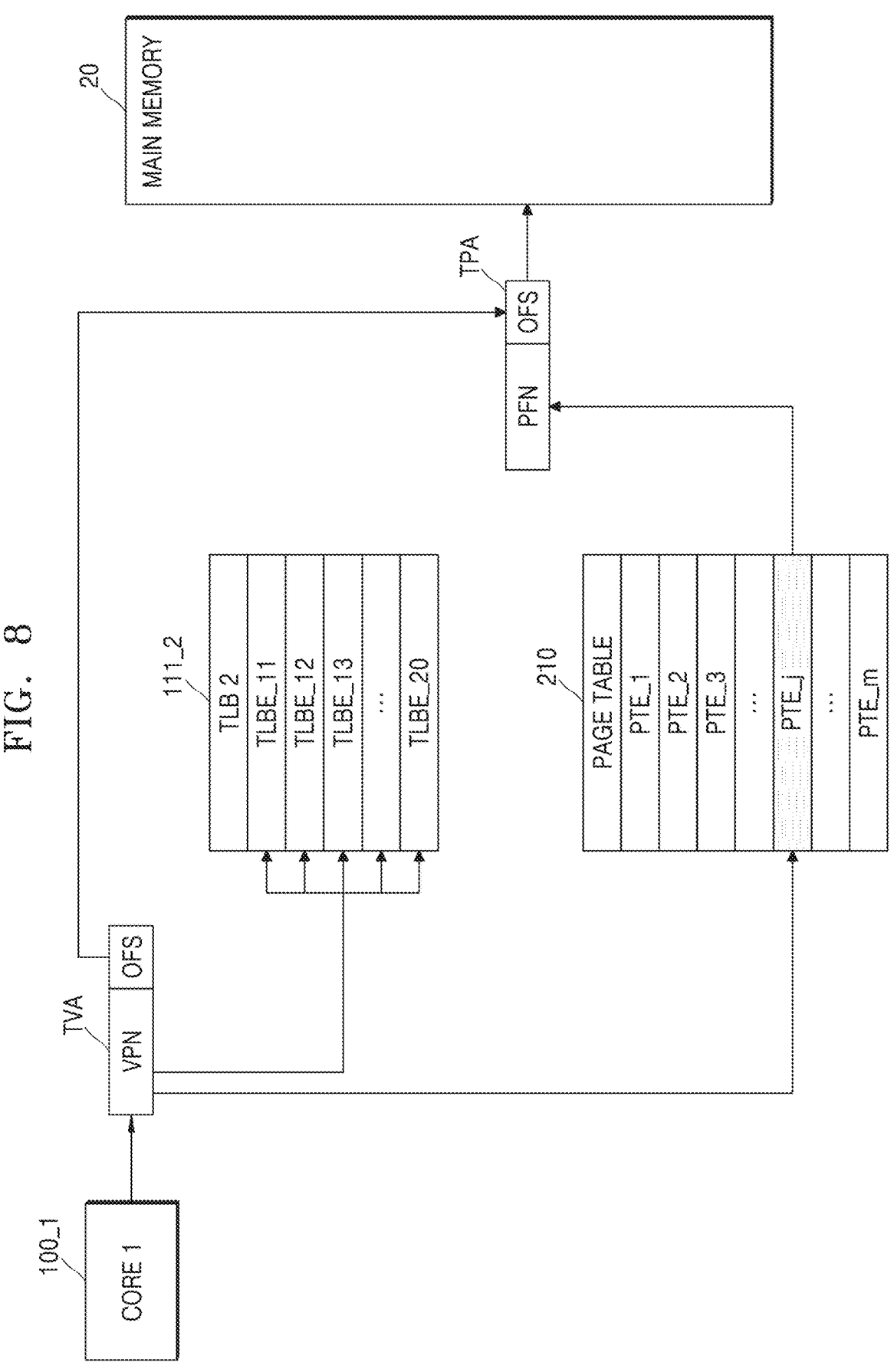
FIG. 8 is a diagram for describing translation of a virtual address into a physical address, according to one or more embodiments.

FIGS. 7 and 8 are diagrams for describing translation of the virtual address into the physical address, according to embodiments. More particularly, FIGS. 7 and 8 are diagrams for describing a case in which a TLB miss occurs as a result of looking up the first TLB 111_1 by the first MMU 110_1. FIGS. 7 and 8 may be described with reference to FIGS. 1 to 6, and repeated description may be omitted.

Referring to FIG. 7, when a TLB miss occurs as a result of looking up the first TLB by the first MMU 110_1, the first TLB predictor 113_1 may provide the TLB check request tc_req to the second core 100_2, based on the first check weight table 114_1. In addition, when the TLB miss occurs as a result of looking up the first TLB 111_1 by the first MMU 110_1, the first page table walker 112_1 may look up the page table 210.

When a TLB hit occurs as a result of looking up the second TLB 111_2 by the second MMU 110_2 in response to the TLB check request tc_req, the second core 100_2 may generate the TLB check response tc_res including the physical frame number PFN corresponding to the virtual page number VPN. The second core 100_2 may be configured to look up the TLB check response tc_res that has been generated to the first TLB predictor 113_1. When the first TLB predictor 113_1 receives the TLB check response tc_res, the first core 100_1 may translate the target virtual address TVA into the target physical address TPA, based on the TLB check response tc_res. In this case, the first core 100_1 may stop the page table walk operation of the first page table walker 112_1.

In one or more embodiments, it is assumed that a twelfth TLB entry TLBE_12 of the second TLB 111_2 includes a pair of the virtual page number VPN and the physical frame number PFN. In this case, as a result of looking up the second TLB 111_2 by the second MMU 110_2 in response to the TLB check request tc_req, the TLB hit may occur. The second core 100_2 may be configured to generate the TLB check response tc_res including the physical frame number PFN corresponding to the virtual page number VPN. The second core 100_2 may be configured to check the TLB check response tc_res that is generated to the first TLB predictor 113_1. The first MMU 110_1 may be configured to extract the physical frame number PFN corresponding to the virtual page number VPN based on the TLB check response tc_res and extract the offset value OFS from the target virtual address TVA. The first MMU 110_1 may be configured to translate the target virtual address TVA into the target physical address TPA, based on the physical frame number PFN and the offset value OFS those have been extracted. The first core 100_1 may be configured to perform the series of operations related to the first process 220 by accessing the main memory 20 based on the target physical address TPA.

Referring to FIG. 8, it is assumed that the TLB miss occurs as a result of looking up the first TLB 111_1 by the first MMU 110_1 and the TLB miss occurs as a result of looking up the second TLB 111_2 by the second core 100_2 based on the TLB check request tc_req. In this case, the target virtual address TVA may be translated into the target physical address TPA based on the page table 210.

In one or more embodiments, it is assumed that a jth page table entry PTE_j of the page table 210 includes the physical frame number PFN corresponding to the virtual page number VPN. The first MMU 110_1 may be configured to extract the physical frame number PFN corresponding to the virtual page number VPN through the page table walk operation and extract the offset value OFS from the target virtual number TVA. The first MMU 110_1 may be configured to translate the target virtual address TVA into the target physical address TPA, based on the physical frame number PFN and the offset value OFS those have been extracted. The first core 100_1 may be configured to perform the series of operations related to the first process 220 by accessing the main memory 20 based on the target physical address TPA.

Figure 9:
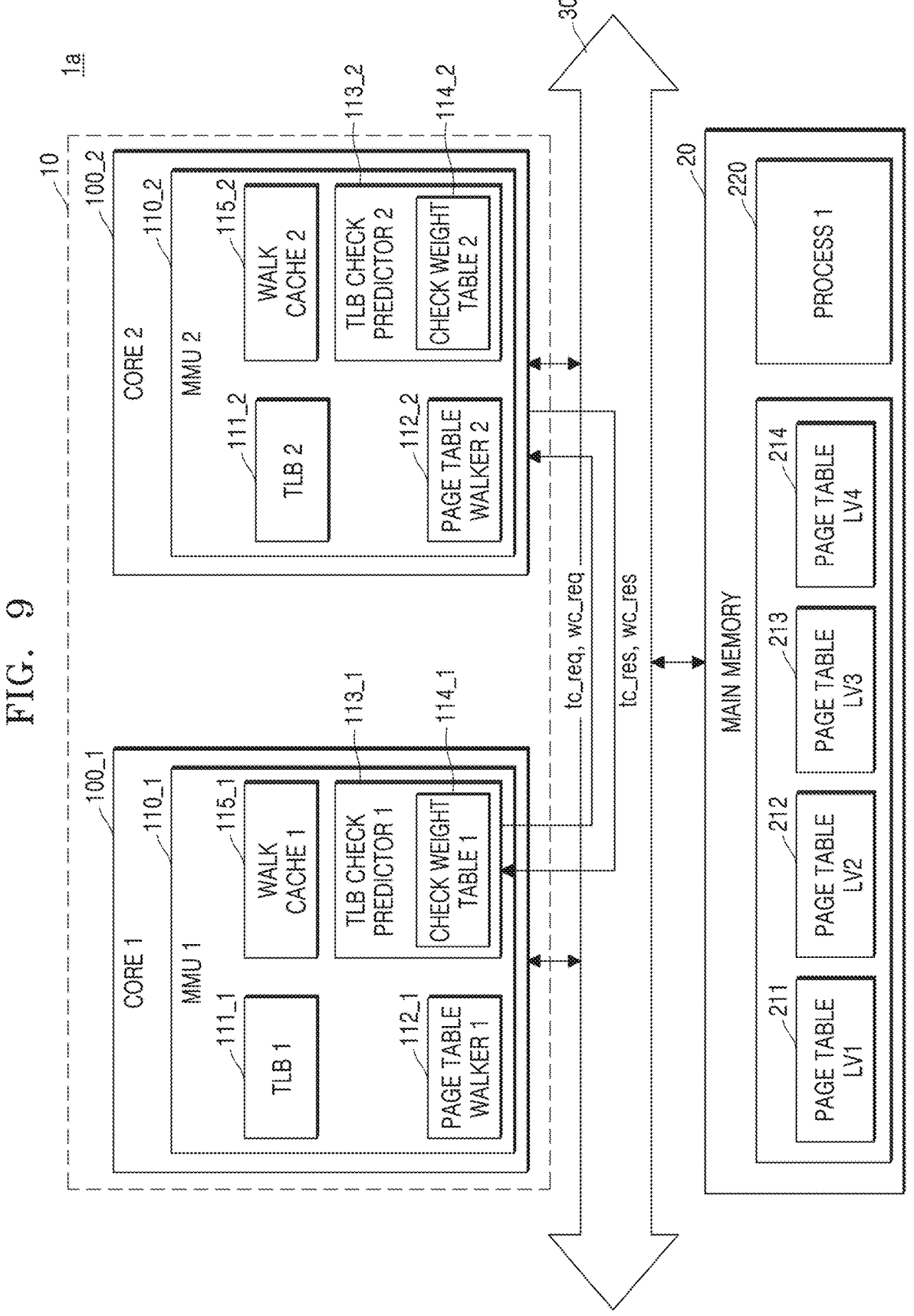
FIG. 9 is a block diagram of an electronic device according to embodiments.

FIG. 9 is a block diagram of an electronic device 1a according to embodiments. FIG. 9 may be described with reference to FIGS. 1 and 2, and repeated descriptions may be omitted.

Referring to FIG. 9, the electronic device 1a may include the processor 10, the main memory 20, and the coherent interconnect 30. The processor 10 may include the first core 100_1 and the second core 100_2. The first core 100_1 may include the first MMU 110_1. The first MMU 110_1 may include the first TLB 111_1, the first page table walker 112_1, the first TLB predictor 113_1, and a first walk cache 115_1. The second core 100_2 may include the second MMU 110_2. The second MMU 110_2 may include the second TLB 111_2, the second page table walker 112_2, the second TLB predictor 113_2, and a second walk cache 115_2.

The first walk cache 115_1 may be configured to store intermediate translation values extracted during the page table walk operation of the first page table walker 112_1. The second walk cache 115_2 may be configured to store intermediate translation values extracted during the page table walk operation of the second page table walker 112_2. The intermediate translation values will be described later with reference to FIG. 10.

The first TLB predictor 113_1 may include a first check weight table 114_1. The first TLB predictor 113_1 may be configured to provide the TLB check request tc_req and a walk cache check request wc_req to the second core 100_2, based on the first check weight table 114_1. The first TLB predictor 113_1 may be configured to receive the TLB check response tc_res and a walk cache check response wc_res from the second core 100_2.

In one or more embodiments, when the physical address corresponding to the target virtual address is in the first TLB 111_1, the first TLB predictor 113_1 may not generate the TLB check request tc_req and the walk cache check request wc_req. The first MMU 110_1 may be configured to translate the target virtual address into the physical address, based on information looked up in the first TLB 111_1.

In one or more embodiments, when the physical address corresponding to the target virtual address is not in the first TLB 111_1, the first TLB predictor 113_1 may be configured to generate the TLB check request tc_req. The first TLB predictor 113_1 may be configured to provide the TLB check request tc_req that is generated to the second core 100_2. When the second core 100_2 receives the TLB check request tc_req from the first TLB predictor 113_1, the second core 100_2 may be configured to look up a second TLB 111_2 through a second MMU 110_2. When the physical address corresponding to the target virtual address is in the second TLB 111_2, the second core 100_2 may be configured to generate a TLB check response tc_res including the physical address corresponding to the target virtual address. The second core 100_2 may be configured to provide the TLB check response tc_res that has been generated to the first TLB predictor 113_1. When the first TLB predictor 113_1 receives the TLB check response tc_res, the first core 100_1 may be configured to translate the target virtual address into the physical address, based on the TLB check response tc_res.

In one or more embodiments, when the physical address corresponding to the target virtual address is not in the first TLB 111_1, the first TLB predictor 113_1 may generate the walk cache check request wc_req. The first TLB predictor 113_1 may be configured to provide the walk cache check request wc_req that has been generated to the second core 100_2. When the second core 100_2 receives the walk cache check request wc_req from the first TLB predictor 113_1, the second core 100_2 may look up the second walk cache 115_2 through the second MMU 110_2. The second core 100_2 may be configured to look up walk cache entries having index values identical to at least a portion of the target virtual address among a plurality of walk cache entries stored in the second walk cache 115_2. In the present specification, when a walk cache entry identical to at least a portion of the target virtual address is in the second walk cache 115_2, a result of looking up the walk cache entry may be referred to as a walk cache hit. On the contrary, when there is no walk cache entry identical to at least a portion of the target virtual address, a result of looking up the walk cache entry may be referred to as a walk cache miss. The second core 100_2 may be configured to select a walk cache entry most consistent to the target vertical address among the walk cache entries that have been looked up. For example, it is assumed that a first walk cache entry includes a first level index value of the target virtual address, an intermediate translation value corresponding to a first level index of the target virtual address, a second level index value of the target virtual address, and an intermediate translation value corresponding to the second level index value of the target virtual address. It is also assumed that a second walk cache entry includes the first level index of the target virtual address and the intermediate translation value corresponding to the first level index value of the target virtual address. In this case, the second core 100_2 may select the first walk cache entry. The second core 100_2 may be configured to generate the walk cache check response wc_res based on the walk cache entry that has been selected. The second core 100_2 may be configured to provide the walk cache check response wc_res that has been generated to the first TLB predictor 113_1. When the first TLB predictor 113_1 receives the walk cache check response wc_res, the first core 100_1 may translate the target virtual address into the physical address, based on the walk cache check response wc_res.

The main memory 20 may be configured to store the page table 210 and the first process 220. The page table 210 may include the four-level page table. That is, the page table 210 may include a first level page table 211, a second level page table, a third level page table 213, and a fourth level page table 214. The embodiment shown in FIG. 9, in which the page table 210 includes the four-level page table, is only an example for descriptions, and the page table 210 may be implemented as a page table having less levels or more levels.

In one or more embodiments, it is assumed that the first core 100_1 translates the target virtual address into the physical address. The first core 100_1 may be configured to look up the first TLB 111_1 based on the target virtual address. When a TLB miss occurs as a result of looking up the first TLB 111_1, the first core 100_1 may look up a check weight value corresponding to the target virtual address in the first check weight table 114_1. When the check weight value that has been looked up is the reference value or greater, the first core 100_1 may generate the TLB check request tc_req and the walk cache check request wc_req and provide the TLB check request tc_req and the walk cache check request wc_req to the second core 100_2, through the first TLB predictor 113_1. When the check weight value that has been looked up is less than the reference value, the first core 100_1 may not generate the TLB check request tc_req and the walk cache check request wc_req through the first TLB predictor 113_1. In other words, the first core 100_1 may access the page table 210 of the main memory 20 and perform address translation through the page table walk operation without looking up the address translation information stored in the second core 100_2.

In one or more embodiments, when a walk cache hit occurs as a result of looking up the second walk cache 115_2 by the second core 100_2 in response to the walk cache check request wc_req, the first TLB predictor 113_1 may increase the check weight value corresponding to the target virtual address. For example, when the check weight value is the second value, the first TLB predictor 113_1 may increase the check weight value up to the third value. When a walk cache miss occurs as a result of looking up the second walk cache 115_2 by the second core 100_2 in response to the walk cache check request wc_req, the first TLB predictor 113_1 may decrease the check weight value corresponding to the target virtual address. For example, when the check weight value is the second value, the first TLB predictor 113_1 may decrease the check weight value down to the first value.

In one or more embodiments, the reference value may be variously modified according to embodiments. The reference value may include a preset value input when the electronic device 1 is designed. For example, in a case where the reference value is the second value, when the check weight value corresponding to the target virtual address includes the second value, the third value, and the fourth value, the first TLB predictor 113_1 may generate the TLB check request tc_req and the walk cache check request wc_req. On the other hand, in a case where the reference value is the second value, when the check weight value corresponding to the target virtual address includes the first value, the TLB predictor 113_1 may not generate the TLB check request tc_req and the walk cache check request wc_req.

Figure 10:
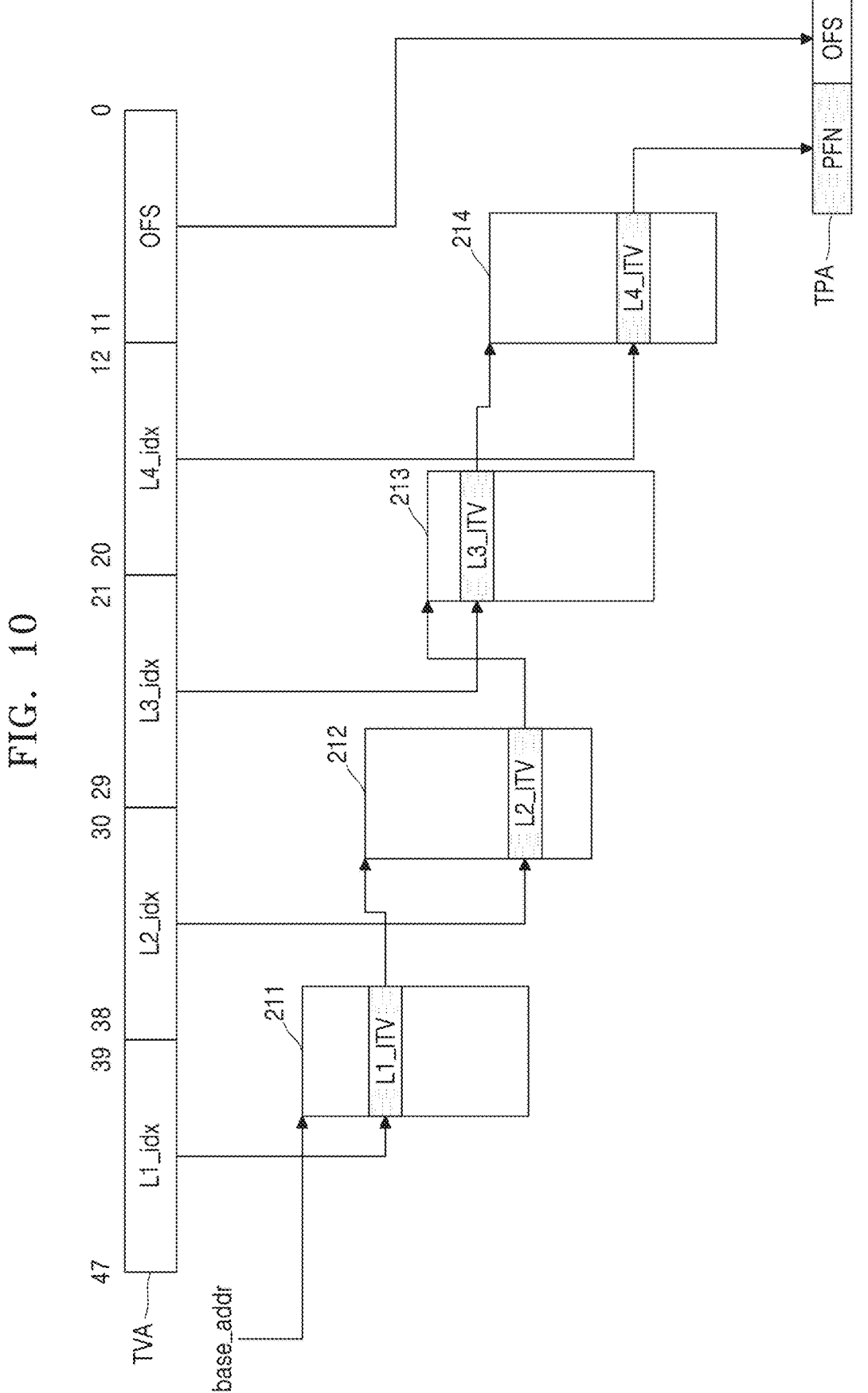
FIG. 10 is a diagram for describing page table work operations according to embodiments.
Figure 11:
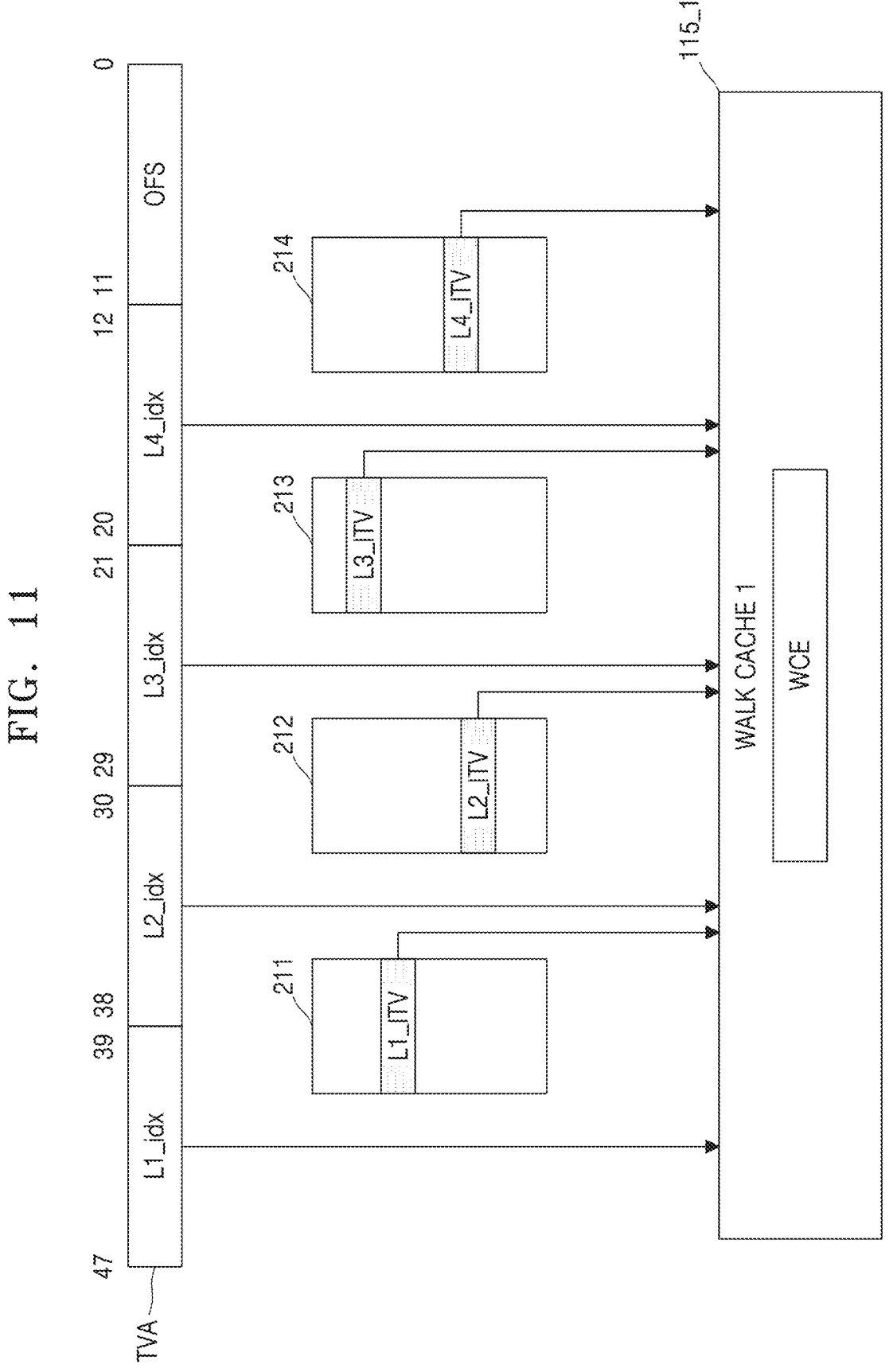
FIG. 11 is a diagram for describing page table work operations according to embodiments.

FIGS. 10 and 11 are diagrams for describing page table work operations according to embodiments; More particularly, FIG. 10 is a diagram for describing the page table walk operation to look up the four-level page table, and FIG. 11 is a diagram for describing the walk cache entry including the intermediate translation values extracted during the page table walk operation. FIGS. 10 and 11 may be described with reference to FIGS. 1, 2, and 9, and repeated description may be omitted.

Referring to FIG. 10, the target virtual address TVA may include forty-eight bits. The target virtual address TVA may be divided into a first level index value L1_idx, a second level index value L2_idx, a third level index value L3_idx, a fourth level index value L4_idx, and the offset value OFS. The first level page table 211 may include a plurality of first level page table entries. In one or more embodiments, the first level index value L1_idx, the second level index value L2_idx, the third level index value L3_idx, and the fourth level index value L4_idx may each include nine bits, and the offset value OFS may include twelve bits. This is only an example for description and is not intended to limit the disclosure.

In the present specification, among the plurality of first level page table entries, a first level page table entry mapped with the first level index value L1_idx may be referred to as a first intermediate translation value L1_ITV. The second level page table 212 may include a plurality of second level page table entries. Among the plurality of second level page table entries, a second level page table entry mapped with the second level index value L2_idx may be referred to as a second intermediate translation value L2_ITV. The third level page table 213 may include a plurality of third level page table entries. Among the plurality of third level page table entries, a third level page table entry mapped with the third level index value L3_idx may be referred to as a third intermediate translation value L3_ITV. The fourth level page table 214 may include a plurality of fourth level page table entries. Among the plurality of fourth level page table entries, a fourth level page table entry mapped with the fourth level index value L4_idx may be referred to as a fourth intermediate translation value L4_ITV.

The first MMU 110_1 may be configured to perform the page table walk operation with respect to the page table 210 through the first page table walker 112_1. The first core 100_1 and the second core 100_2 may each include a translation table base resistor (TTBR). A base address base_addr may include a value stored in the TTBR. The base address base_addr may include an address indicating a position of the first level page table 211 in a physical memory.

In one or more embodiments, the first MMU 110_1 may be configured to access the first level page table 211 based on the base address base_addr. The first MMU may be configured to look up the first level page table 211 based on the first level index value L1_idx and extract the first intermediate translation value L1_ITV corresponding to the first level index value L1_idx. The first MMU 110_1 may be configured to look up the second level page table 212 based on the second level index value L2_idx and extract the second intermediate translation value L2_ITV corresponding to the second level index value L2_idx. The first MMU 110_1 may be configured to look up the third level page table 213 based on the third level index value L3_idx and extract the third intermediate translation value L3_ITV corresponding to the third level index value L3_idx. The first MMU 110_1 may be configured to look up the fourth level page table 214 based on the fourth level index value L4_idx and extract the fourth intermediate translation value L4_ITV corresponding to the fourth level index value L4_idx.

The first MMU 110_1 may be configured translate the virtual page number of the target virtual address TVA into the physical frame number PFN, based on the fourth intermediate translation value L4_ITV. The first MMU 110_1 may be configured to translate the target virtual address TVA into the target physical address TPA, based on the physical frame number PFN translated through the fourth intermediate translation value L4_ITV and the offset value OFS extracted from the target virtual address TVA.

Referring to FIG. 11, the first walk cache 115_1 may include a walk cache entry WCE.

The first page table walker 112_1 may store the index values of the target virtual address TVA and intermediate result values extracted during the page table walk operation as the walk cache entry WCE in the first walk cache 115_1.

In one or more embodiments, the walk cache entry WCE may include the first index value L1_idx, the first intermediate translation value L1_ITV corresponding to the first index value L1_idx, the second index value L2_idx, the second intermediate translation value L2_ITV corresponding to the second index value L2_idx, the third index value L3_idx, the third intermediate translation value L3_ITV corresponding to the third index value L3_idx, the fourth index value L4_idx, and the fourth intermediate translation value L4_ITV corresponding to the fourth index value L4_idx.

Like the first MMU 110_1 stores the index values of the target virtual address TVA and the intermediate result values extracted during the page table walk operation in the first walk cache 115_1, the second MMU 110_2 may also be configured to store the index values of the target virtual address TVA and the intermediate result values extracted during the page table walk operations in the second walk cache 115_2, and repeated descriptions may be omitted.

Figure 12:
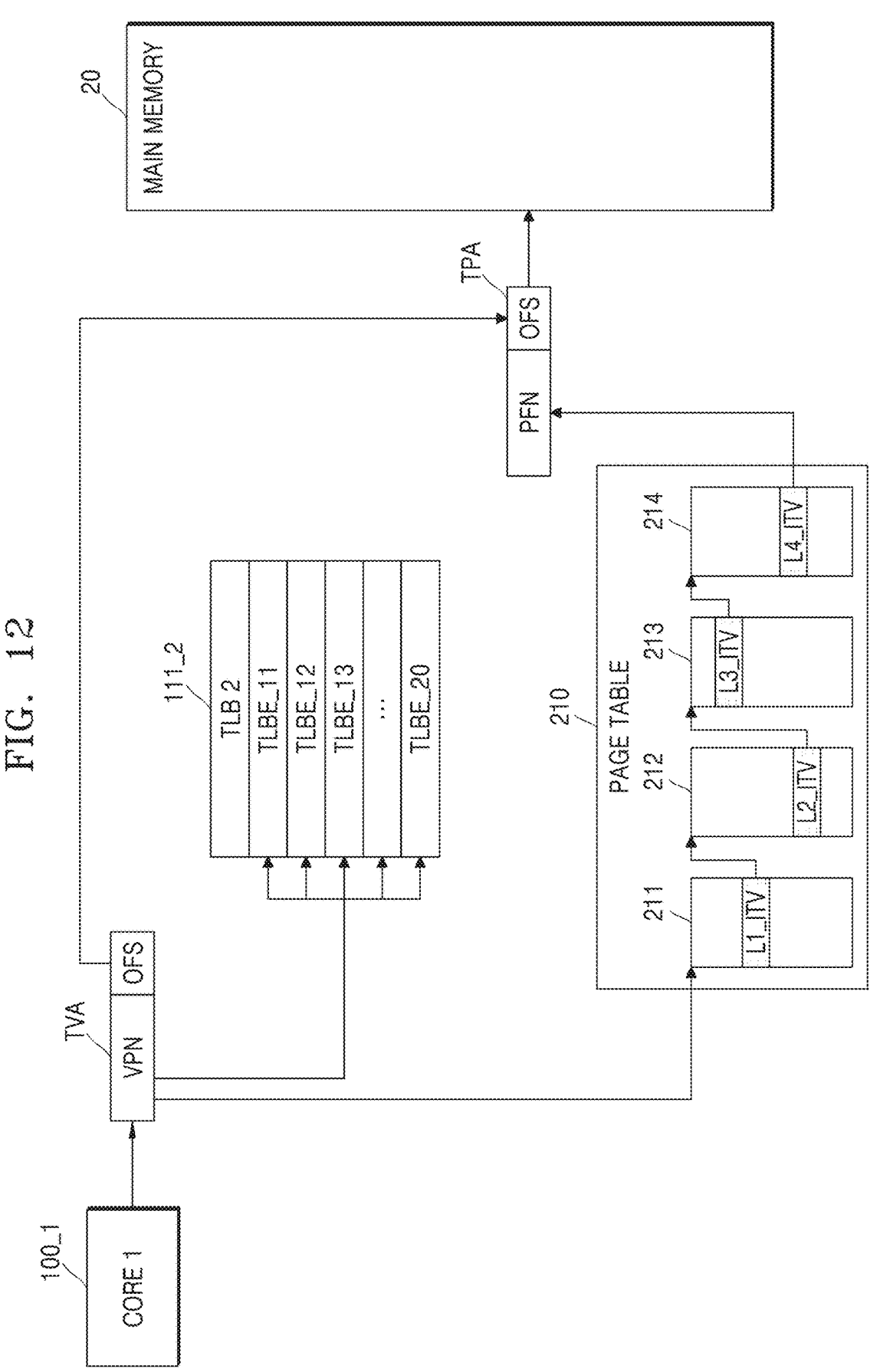
FIG. 12 is a diagram for describing translation of virtual addresses into physical addresses, according to embodiments.
Figure 13:
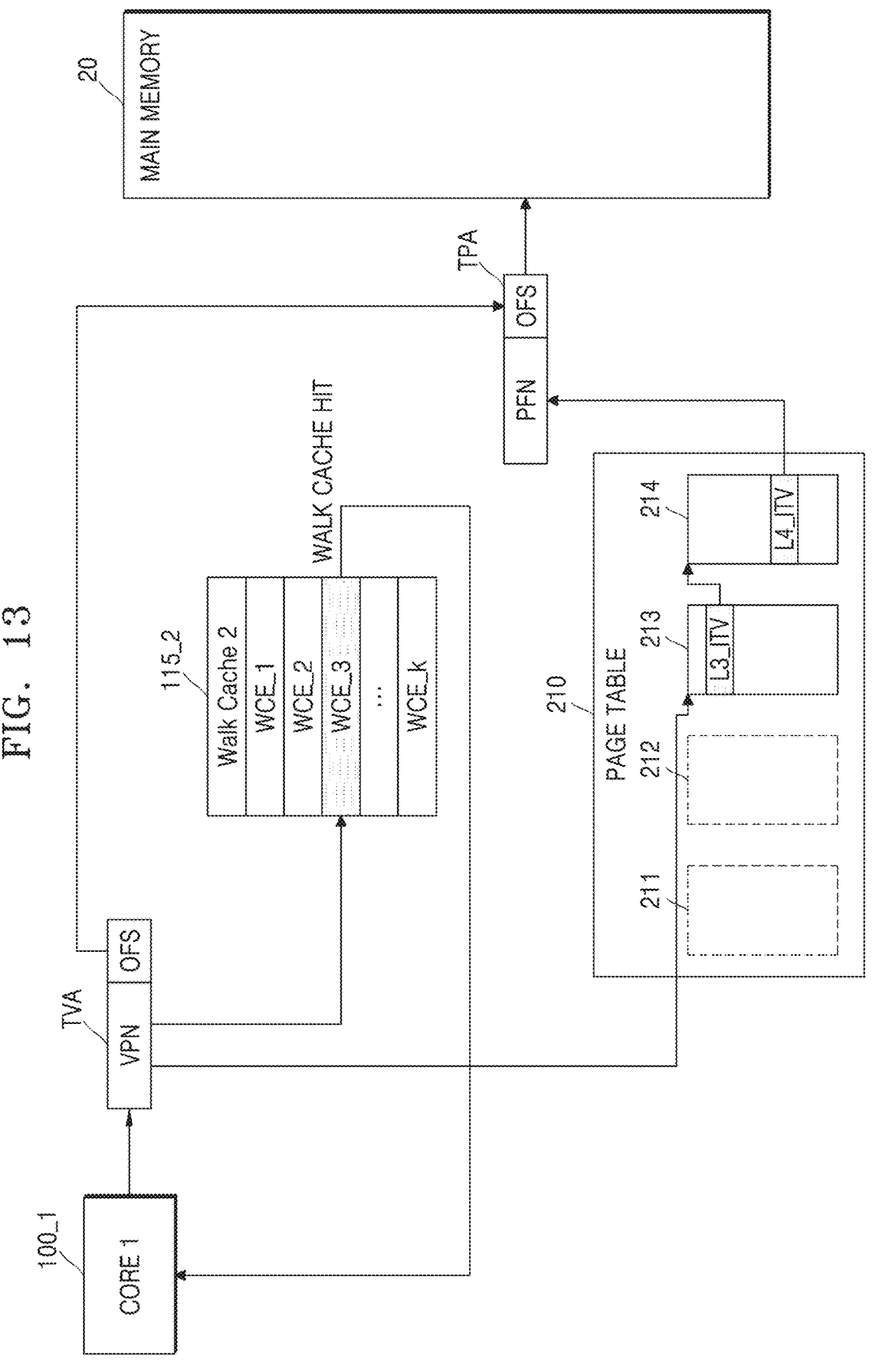
FIG. 13 is a diagram for describing translation of virtual addresses into physical addresses, according to embodiments.

FIGS. 12 and 13 are diagrams for describing translation of virtual addresses into physical addresses according to embodiments. More particularly, FIG. 12 is a diagram for describing a case in which a result of looking up the second TLB 111_2 by the second MMU 110_2 in response to the TLB check request tc_req is a TLB miss. FIG. 13 is a diagram for describing a case in which a walk cache hit occurs as a result of looking up the second walk cache 115_2 by the second MMU 110_2 in response to the walk cache check request wc_req. FIGS. 12 and 13 may be described with reference to FIGS. 9 to 11, and repeated descriptions may be omitted.

Referring to FIG. 12, when the TLB miss occurs as a result of looking up the first TLB 111_1 by the first MMU 110_1, the first TLB predictor 113_1 may provide the TLB check request tc_req to the second core 100_2, based on the check weight table. When the TLB miss occurs as a result of looking up the first TLB 111_1 by the first MMU 110_1, the first page table walker 112_1 may look up the page table 210. In addition, the second core 100_2 may look up the second TLB 111_2 based on the TLB check request tc_req received from the first core 100_1. When the result of looking up the second TLB 111_2 by the second core 100_2 based on the TLB check request tc_req is also the TLB miss, the first core 100_1 may continuously perform the page table walk operation with respect to the page table 210. The first page table walker 112_1 may extract the physical frame number PFN corresponding to the virtual page number VPN by performing the page table walk operations with respect to the first level page table 211 to the fourth level page table 214. The first MMU 110_1 may extract the offset value OFS from the target virtual address TVA. The first MMU 110_1 may be configured to translate the target virtual address TVA into the target physical address TPA, based on the physical frame number PFN and the offset value OFS those have been extracted. The first core 100_1 may be configured to perform a series of operations related to the first process 220 by accessing the main memory 20 based on the target physical address TPA.

Referring to FIG. 13, when the TLB miss occurs as a result of looking up the first TLB 111_1 by the first MMU 110_1, the first TLB predictor 113_ may provide the walk cache check request wc_req to the second core 100_2, based on the check weight table. In this case, the result of looking up the first walk cache 115_1 by the first MMU 110_1 may also be a walk cache miss. In one or more embodiments, when the first TLB predictor 113_1 provides the walk cache check request wc_req to the second core 100_2, the TLB check request tc_req may be simultaneously transmitted.

The second core 100_2 may look up the second walk cache 115_2 in response to the walk cache check request wc_req. Although FIG. 13 illustrates that the second walk cache 115_2 includes first to kth walk cache entries (where k is a natural number of 1 or greater), this is an example for description and is not intended to limit the disclosure. In one or more embodiments, it is assumed that a walk cache entry most consistent to the target virtual address, among the walk cache entries looked up in the second walk cache 115_2, includes a third walk cache entry WCE_3. In addition, it is also assumed that the third walk cache entry WCE_3 includes the first level index value L1_idx, the first intermediate translation value L1_ITV, the second level index value L2_idx, and the second intermediate translation value L2_ITV. In this case, a result of looking up the second walk cache 115_2 may include a walk cache hit, and the second core 100_2 may generate the walk cache check response wc_res based on the values included in the third walk cache entry WCE_3. The second core 100_2 may be configured to provide the walk cache check response wc_res that has been generated to the first TLB predictor 113_1.

When the first TLB predictor 113_1 receives the walk cache check response wc_res, the first core 100_1 may update the first walk cache 115_1 based on the walk cache check response wc_res. In other words, the first core 100_1 may be configured to store the values included in the third walk cache entry WCE_3 in the first walk cache 115_1, based on the walk cache check response wc_res.

In one or more embodiments, assumed is a situation in which, after values corresponding to the third walk cache entry WCE_3 are updated in the first walk cache 115_1, the first core 100_1 needs to look up the page table 210 to translate the target virtual address TVA back to the physical address. In this case, based on the values corresponding to the third walk cache entry WCE_3 stored in the first walk cache 115_1, a portion of the page table walk operation performed by the first page table walker 112_1 may be omitted. Referring to FIG. 13, the first page table walker 112_1 may omit the page table walk operations with respect to the first level page table 211 and the second level page table 212 and perform the page table walk operations with respect to the third level page table 213 and the fourth level page table 214. In other words, the page table walk operation may be accelerated. Like this, by updating the first walk cache 115_1 based on the walk cache entry stored in the second walk cache 115_2, a time period for the first core 100_1 to perform the page table walk operation may be saved, and the performance of the processor 10 may be improved.

Figure 14:
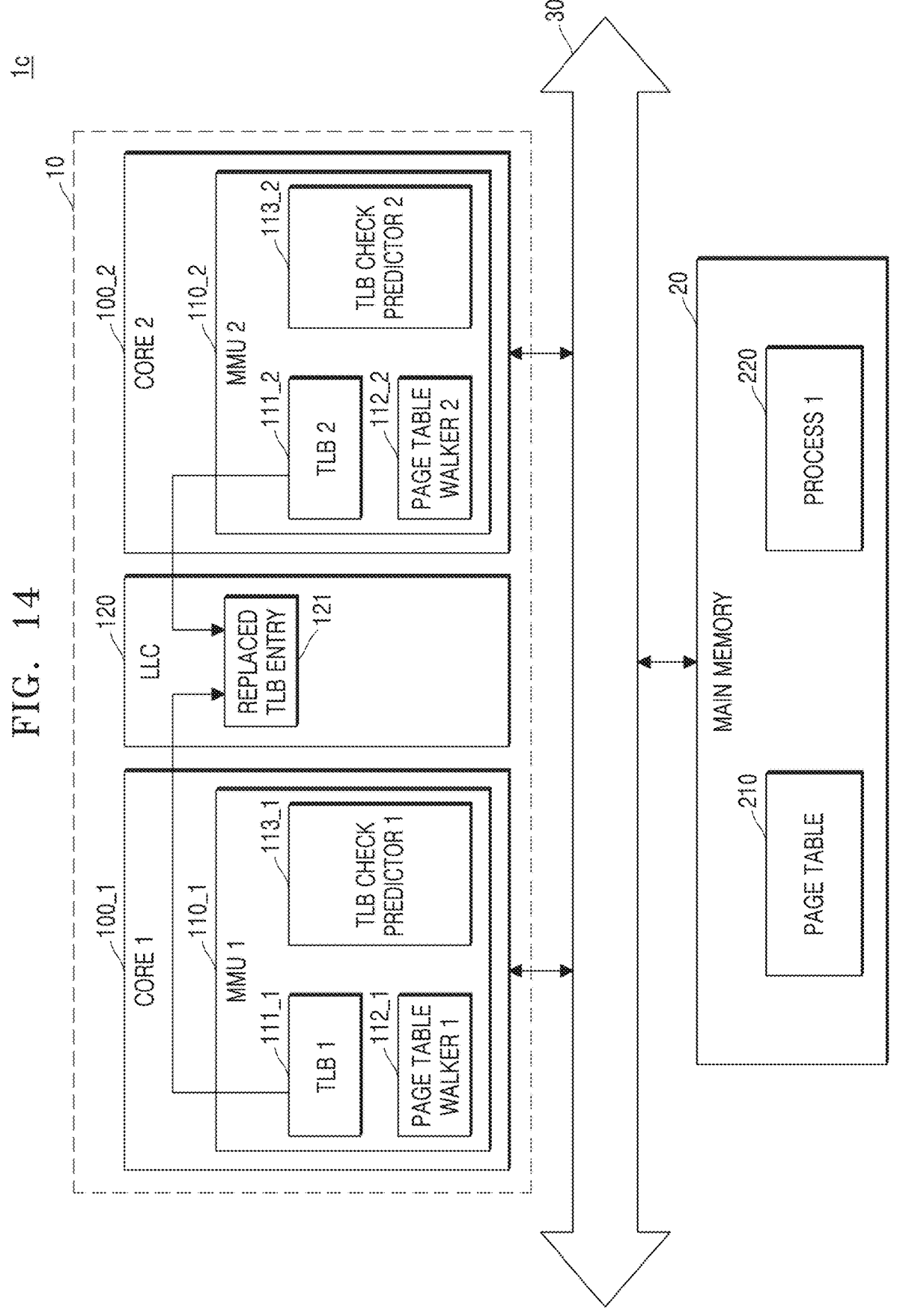
FIG. 14 is a block diagram of an electronic device according to one or more embodiments.

FIG. 14 is a block diagram of an electronic device 1c according to one or more embodiments. FIG. 14 may be described with reference to FIG. 2, and repeated descriptions may be omitted.

Referring to FIG. 14, the electronic device 1c may include the processor 10, the main memory 20, and the coherent interconnect 30. The processor 10 may include the first core 100_1, the second core 100_2, and a last level cache 120. The first core 100_1 may include the first MMU 110_1. The first MMU 110_1 may include the first TLB 111_1, the first page table walker 112_1, and the first TLB predictor 113_1. The second core 100_2 may include the second MMU 110_2. The second MMU 110_2 may include the second TLB 111_2, the second page table walker 112_2, and the second TLB predictor 113_2.

In one or more embodiments, when the first core 100_1 translates the target virtual address into the physical address based on the page table walk operation, a page table entry looked up through the page table walk operation may be updated in the first translation lookaside buffer 111_1. In this case, when a capacity of the first translation lookaside buffer 111_1 is full, some of the TLB entries that have been stored may be replaced with new TLB entries. Here, replacement of the TLB entries may be performed by a TLB replacement algorithm, and the TLB replacement algorithm may include, for example, First In First Out (FIFO), Least Recently Used (LRU), a random algorithm, and the like.

The last level cache 120 may be configured to store TLB entries 121 those have been replaced. In other words, TLB entries withdrawn from the first TLB 111_1 by the TLB replacement algorithm may be stored in the last level cache 120.

In one or more embodiments, the last level cache 120 may be referred to as a L3 cache.

In one or more embodiments, the first core 100_1 may be configured to translate the target virtual address into the physical address by looking up the last level cache 120 before looking up the page table 210.

Although the descriptions have been made mainly about the first core 100_1 with reference to FIG. 14, likewise, also in a case of the second core 100_2, TLB entries withdrawn from the second TLB 111_2 by the TLB replacement algorithm may be stored in the last level cache 120, and repeated descriptions will be omitted.

Figure 15:
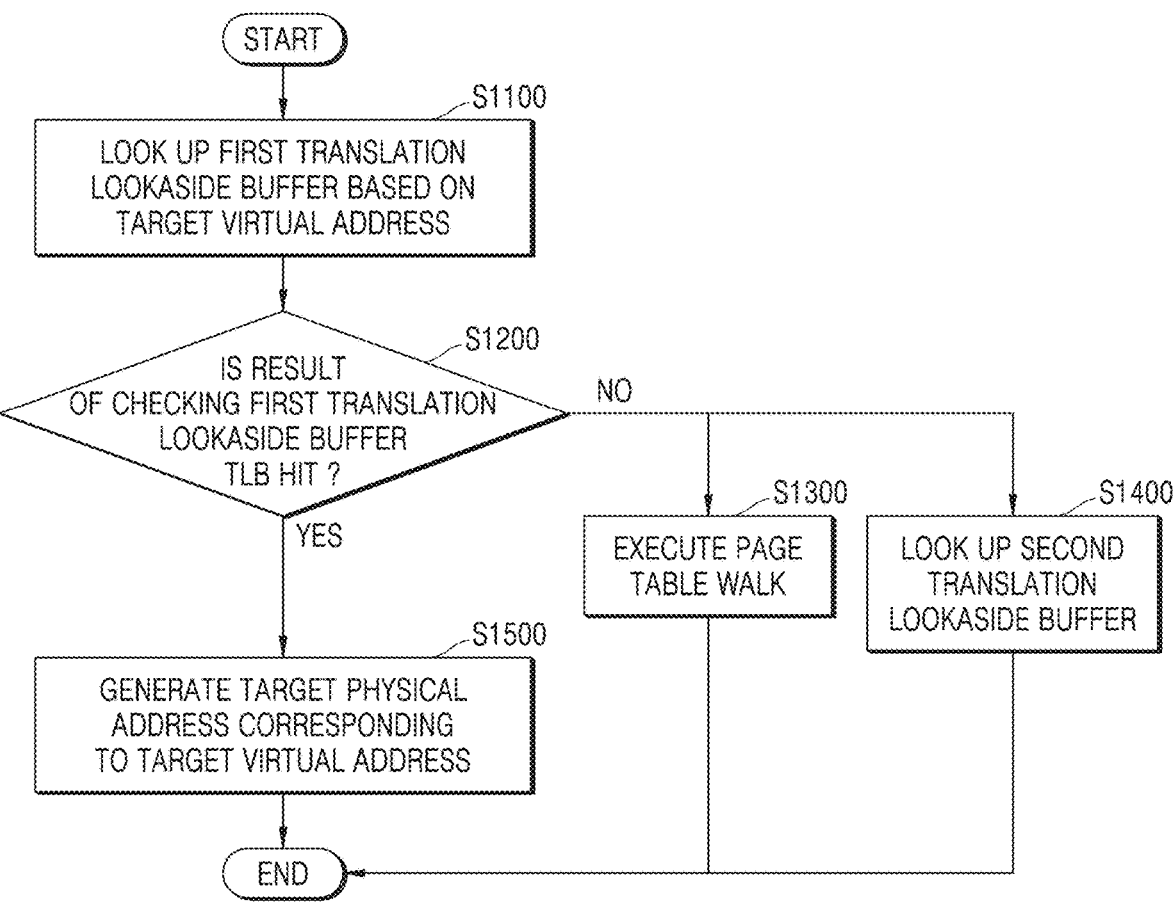
FIG. 15 is a flowchart of an operating method of an electronic device, according to one or more embodiments.

FIG. 15 is a flowchart of an operating method of an electronic device according to one or more embodiments. FIG. 15 may be described with reference to FIGS. 1 to 14, and repeated descriptions may be omitted.

Referring to FIG. 15, in S1100, the first core 100_1 may look up the first TLB 111_1 based on the target virtual address TVA. In one or more embodiments, the target virtual address may include a virtual address of the first process 220 executed by the first core 100_1 and the second core 100_2.

In S1200, the first core 100_1 may determine whether a result of looking the first TLB 111_1 in S1100 is a TLB hit. In one or more embodiments, the first core 100_1 may determine whether to perform the page table walk operation and to look up the second TLB 111_2, based on the result of checking the first TLB 111_1 in S1100.

In S1300, when the result of looking up the first TLB 111_1 by the first core 100_1 based on the target virtual address TVA is the TLB miss, the first core 100_1 may perform the page table walk operation with respect to the page table 210. Detailed descriptions regarding S1300 will be made later with reference to FIG. 16.

In S1400, when the result of looking up the first TLB 111_1 by the first core 100_1 based on the target virtual address TVA is the TLB miss, the first core 100_1 may perform the page table walk operation with respect to the page table 210. Detailed descriptions regarding S1400 will be made later with reference to FIG. 17. In one or more embodiments, S1300 and S1400 may be performed in parallel.

In S1500, when the result of looking up the first TLB 111_1 by the first core 100_1 based on the target virtual address TVA is a TLB hit, the first core 100_1 may generate the target physical address TPA corresponding to the target virtual address TVA.

Figure 16:
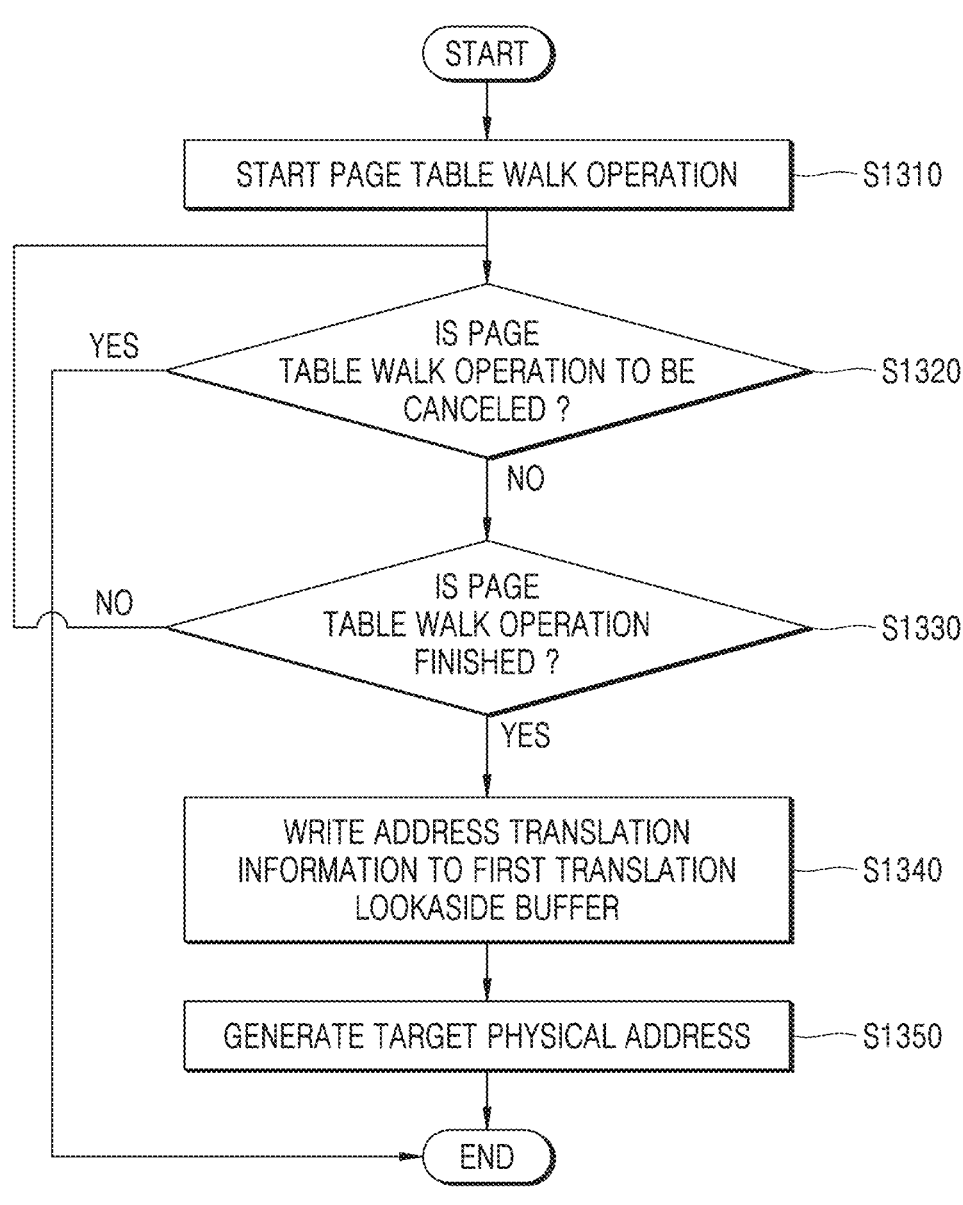
FIG. 16 is a flowchart of an operating method of an electronic device, according to one or more embodiments.

FIG. 16 is a flowchart of an operating method of an electronic device, according to one or more embodiments. More particularly, FIG. 16 is a flowchart showing details of S1300 shown in FIG. 15. FIG. 16 may be described with reference to FIGS. 1 to 15, and repeated description may be omitted.

Referring to FIG. 16, in S1310, the first core 100_1 may start the page table walk operation with respect to the page table 210.

In S1320, the first core 100_1 may determine whether to cancel the page table walk operation. When the first core 100_1 determines to cancel the page table walk operation, S1300 may end without being further performed.

In one or more embodiments, it is assumed that the first core 100_1 receives the TLB check response tc_res from the second core 100_2. In this case, when the TLB check response tc_res that is received is generated in response to that the result of looking up the second TLB 111_2 by the second core 100_2 is a TLB hit, the page table walk operation may be canceled.

In S1330, the first core 100_1 may confirm whether the page table walk operation is finished. When the page table walk operation is not finished, the first core 100_1 may perform S1320 again. When the page table walk operation is finished, the first core 100_1 may perform S1340.

In S1340, the first core 100_1 may write the address translation information, which corresponds to the page table entry looked up through the page table walk operation, to the first TLB 111_1.

In one or more embodiments, the address translation information corresponding to the page table entry may include the virtual page number (VPN) of the target virtual address (TVA) and the physical frame number (PFN) included in the page table entry.

In S1350, the first core 100_1 may be configured to generate the target physical address (TPA), based on the page table entry looked up from the page table 210.

Figure 17:
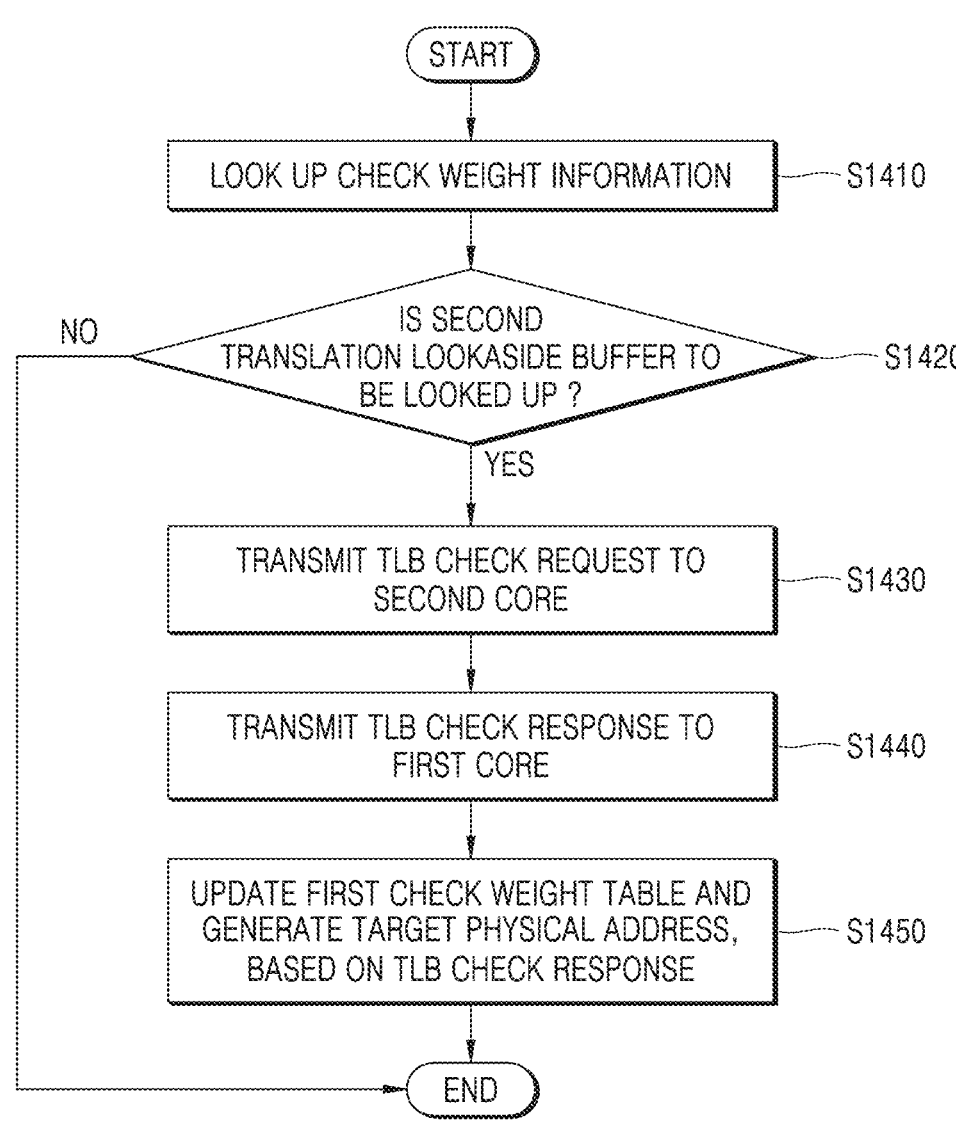
FIG. 17 is a flowchart of an operating method of an electronic device, according to one or more embodiments.

FIG. 17 is a flowchart illustrating an operating method of an electronic device, according to one or more embodiments. More particularly, FIG. 17 is a flowchart showing details of S1400 shown in FIG. 15. FIG. 17 may be described with reference to FIGS. 1 to 15, and repeated descriptions may be omitted.

Referring to FIG. 17, in S1410, the first core 100_1 may look up the first check weight table 114_1. More particularly, the first core 100_1 may look up a check weight value corresponding to the virtual target address TVA from the first check weight table 114_1.

In S1420, the first core 100_1 may determine whether to look up the second TLB. In one or more embodiments, the first core 100_1 may be configured to compare the check weight value, which has been looked up in S1410, with the reference value. When the check weight value looked up in S1410 is equal to the reference value or greater, the first core 100_1 may determine to perform S1430. When the check weight value looked up in S1410 is less than the reference value, the first core 100_1 may stop performing S1400.

In S1430, when the check weight value looked up in the S1410 is the reference value or greater, the first core 100_1 may generate the TLB check request tc_req and transmit the TLB check request tc_req that is generated to the second core 100_2.

In one or more embodiments, the first core 100_1 may be configured to generate the walk cache check request wc_req and transmit the walk cache check request wc_req that is generated to the second core 100_2.

In one or more embodiments, the first core 100_1 may be configured to simultaneously transmit the TLB check request tc_req and the walk cache check request wc_req to the second core 100_2.

In S1440, the second core 100_2 may look up the second TLB 111_2 in response to the TLB check request tc_req. The second core 100_2 may generate the TLB check response tc_res, based on a result of looking up the second TLB 111_2. The second core 100_2 may transmit the TLB check response tc_res that has been generated to the first core 100_1.

In one or more embodiments, the second core 100_2 may be configured to look up the second walk cache 115_2 in response to the walk cache check response wc_res. The second core 100_2 may be configured to generate the walk cache check response wc_res, based on a result of looking up the second walk cache 115_2. The second core 100_2 may be configured to transmit the walk cache check response wc_res that has been generated to the first core 100_1.

In S1450, the first core 100_1 may update the first check weight table 114_1 based on the TLB check response tc_res. The first core 100_1 may generate the target physical address TPA based on the TLB check response tc_res. Details of S140 will be described later with reference to FIG. 18.

In one or more embodiments, the first check weight table 114_1 may be updated based on the walk cache check response wc_res.

Figure 18:
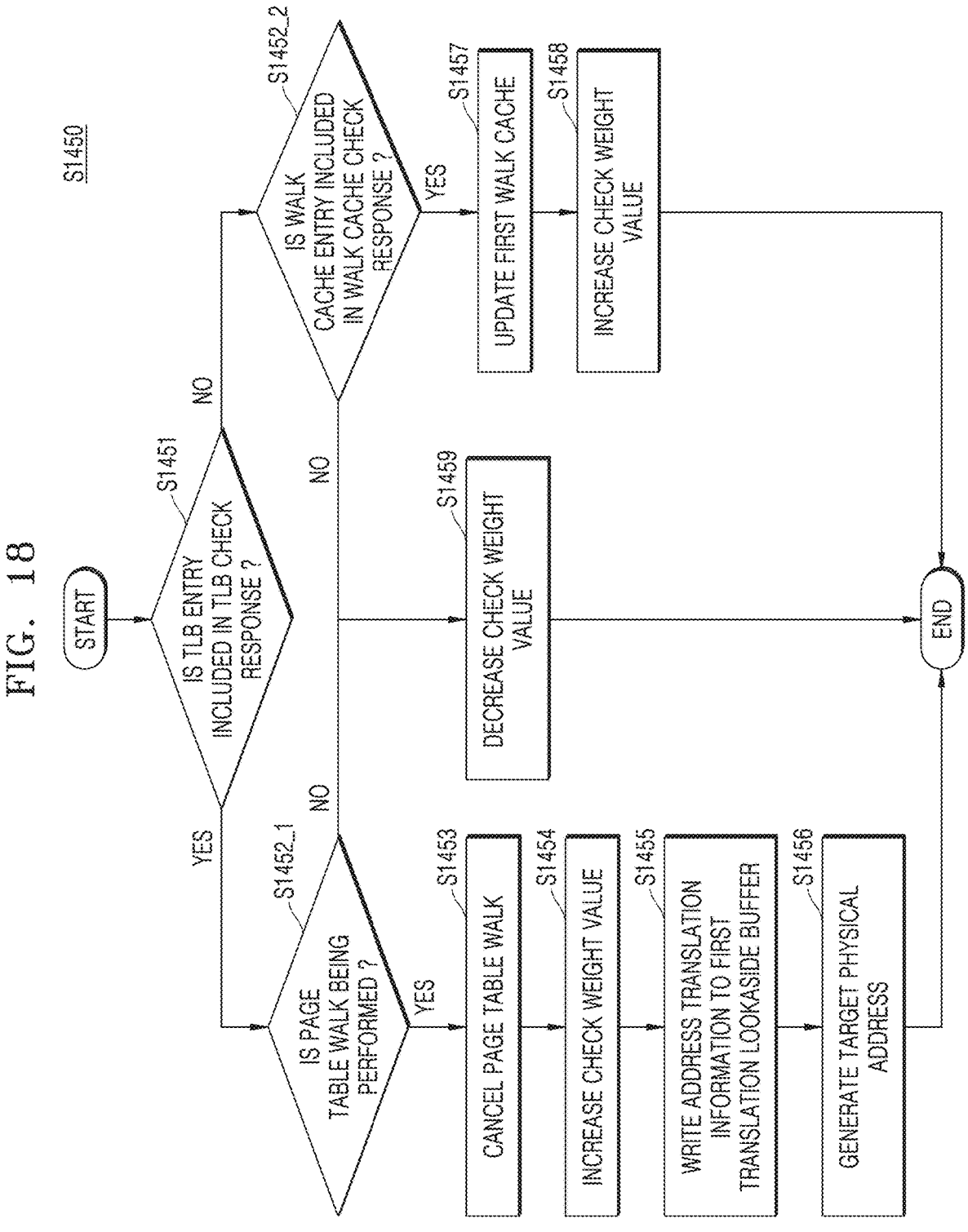
FIG. 18 is a flowchart of an operating method of an electronic device, according to one or more embodiments.

FIG. 18 is a flowchart of an operating method of an electronic device, according to one or more embodiments. More particularly, FIG. 18 is a flowchart showing details of S1450 shown in FIG. 17. FIG. 18 may be described with reference to FIGS. 1 to 15, and 17, and repeated descriptions may be omitted.

Referring to FIG. 18, in S1451, the first core 100_1 may determine whether the TLB entry looked up in the second TLB 111_2 is included in the TLB check response tc_res. In one or more embodiments, the first core 100_1 may receive both the TLB check response tc_res and the walk cache check response wc_res from the second core 100_2.

In S1452_1, when it is determined that the TLB entry looked up in the second TLB 111_2 is included in the TLB check response tc_res, the first core 100_1 may determine whether the page table walk operation is being performed.

In S1452_2, when the first core 100_1 determines that the TLB check response tc_res in S1451 does not include the TLB entry looked up in the second TLB 111_2, the first core 100_1 may determine whether the walk cache check response wc_res includes the walk cache entry looked up in the second walk cache 115_2.

In S1453, when the first core 100_1 determines that the page table walk operation is being performed, the first core 100_1 may cancel the page table walk operation.

In S1454, the first core 100_1 may increase the check weight value corresponding to the target virtual address TVA stored in the first check weight table 114_1.

In S1455, the first core 100_1 may write the address translation information, which corresponds to TLB entry included in the TLB check response tc_res, to the first TLB 111_1.

In S1456, the first core 100_1 may generate the target physical address TPA, based on the TLB entry included in the TLB check response tc_res.

In S1457, when the walk cache check response wc_res includes the walk cache entry looked up in the second walk cache 115_2, the first core 100_1 may update the first walk cache 115_1 by storing the walk cache entry that has been looked up in the first walk cache 115_1.

In S1458, the first core 100_1 may increase the check weight value corresponding to the target virtual address TVA stored in the first check weight table 114_1.

In S1459, the first core 100_1 may decrease the check weight value corresponding to the target virtual address TVA stored in the first check weight table 114_1.

Figure 19:
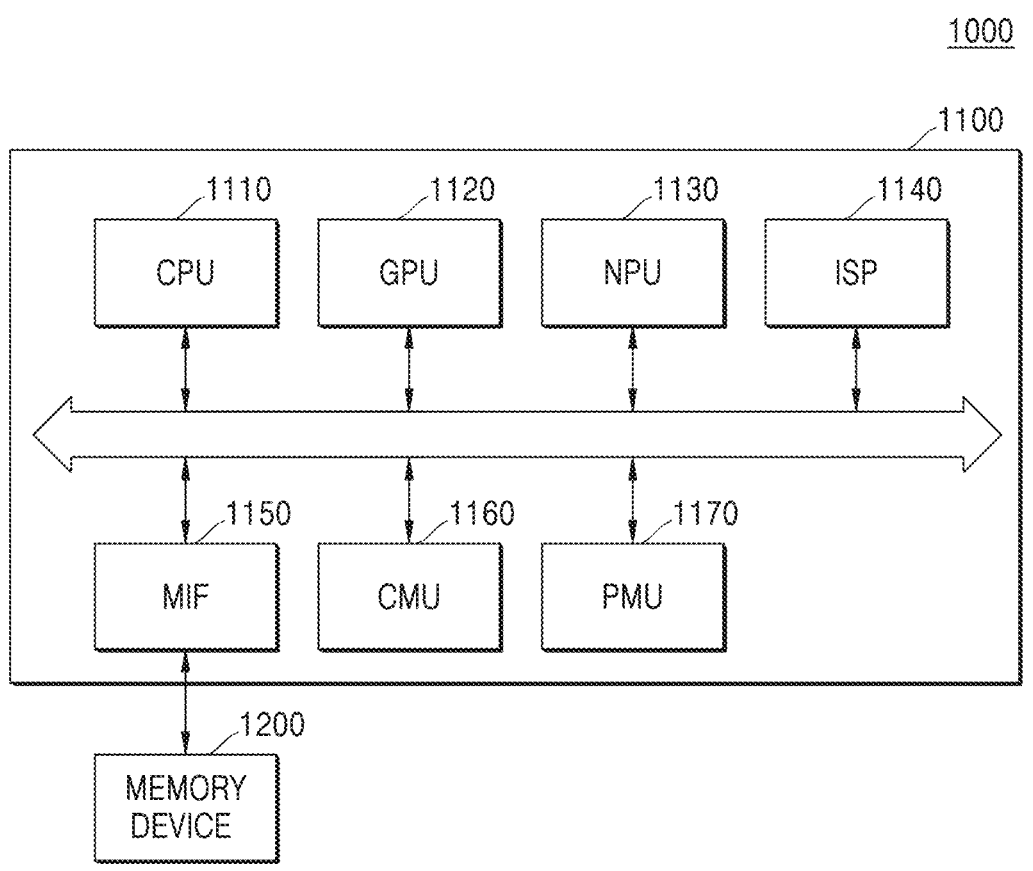
FIG. 19 is a block diagram of a system according to one or more embodiments.

FIG. 19 is a block diagram of a system 1000 according to one or more embodiments.

Referring to FIG. 19, the system 1000 may be implemented as a handheld device, e.g., a mobile phone, a smartphone, a tablet computer, a personal digital assistant (PDA), an enterprise digital assistant (EDA), a digital still camera, a digital video camera, a portable multimedia player (PMP), a personal navigation device or a portable navigation device (PDN), a handheld game console, or an electronic book (e-book).

The system 1000 may include a system-on-a-chip (SoC) 1100 and a memory device 1200. The SoC 1100 may include a central processing unit (CPU) 1110, a graphics processing unit (GPU) 1120, a neural processing unit (NPU) 1130, an image signal processor (ISP) 1140, a memory interface (MIF) 1150, a clock management unit (CMU) 1160, and a power management unit (PMU) 1170. The CPU 1110, the GPU 1120, the NPU 1130, the ISP 1140, and the MIF 1150 may be one or more embodiments of the electronic device 1 described above with reference to FIGS. 1 to 18.

The CPU 1110 may be configured to process or execute instructions and/or data stored in the memory device 1200, in response to a clock signal generated by the CMU 1160.

The GPU 1120 may be configured to obtain image data stored in the memory device 1200, in response to the clock signal generated by the CMU 1160. The GPU 1120 may be configured to generate data for images output through a display device from the image data provided from the MIF 1150, and may also be configured to encode the image data.

The NPU 1130 may refer to an arbitrary device configured to execute a machine learning model. The NPU 1130 may include a hardware block designed to execute the machine learning model. The machine learning model may include a model based on an artificial neural network, a decision tree, a support vector machine, regression analysis, Bayesian network, a genetic algorithm, and the like. As non-limited examples, the artificial neural network may include convolution neural network (CNN), region with convolution neural network (R-CNN), region proposal network (RPN), recurrent neural network (RNN), stacking-based deep neural network (S-DNN), state-space dynamic neural network (S-SDNN), a Deconvolution Network, deep belief network (DBN), restricted Boltzmann machine (RBM), Fully Convolutional Network, long short-term memory (LSTM), Network, and Classification Network.

The ISP 1140 may be configured to perform a signal processing operation with respect to raw data received from an image sensor outside the SoC 1100 and generate digital data having improved image quality.

The MIF 1150 may be configured to provide an interface for the memory device 1200 outside the SoC 1100. The memory device 1200 may include a Dynamic Random Access Memory (DRAM), a Phase-change Random Access Memory (PRAM), a Resistive Random Access Memory (ReRAM), or a flash memory.

The CMU 1160 may be configured to generate a clock signal and provide the clock signal to components of the SoC 1100. The CMU 1160 may include a clock generating device such as a Phase Locked Loop (PLL), a Delayed Locked Loop (DLL), and a crystal. The PMU 1170 may be configured to convert external power to internal power, and the internal power may provide power to the components of the SoC 1100.

Embodiments have been disclosed in the drawings and the specification. Although embodiments have been described using specific terms in the present specification, these terms have been used to describe the inventive concept and not to limit the scope of the inventive concept in the claims. Therefore, those skilled in the art shall understood that various modifications and other equivalent embodiments may be available. Accordingly, the technical scope of the inventive concept shall be determined according to the technical spirit in the following claims.

While the inventive concept has been particularly shown and described with reference to embodiments thereof, it will be understood that various changes in form and details may be made therein without departing from the spirit and scope of the following claims.

What is claimed is:

1. An electronic device comprising:
a processor comprising a first core and a second core, the first core and the second core being configured to execute a process; and
a main memory configured to store a page table corresponding to the process,
wherein the first core comprises:
a first translation lookaside buffer (TLB) configured to store a first portion of the page table;
a page table walker configured to perform a page table walk operation to look up the page table; and a TLB check predictor configured to store a check weight table and, based on the check weight table, transmit a TLB check request to the second core, wherein the second core comprises a second TLB configured to store a second portion of the page table, wherein the first core is configured to translate a virtual address of the process into a physical address, based on a result of the page table walk operation and a TLB check response received from the second core, and wherein the check weight table comprises the virtual address and a check weight value corresponding to the virtual address.

2. The electronic device of claim 1, wherein the second core is further configured to:

perform an operation of looking up the second TLB based on the TLB check request; and transmit the TLB check response, which comprises a result of the operation of looking up the second TLB, to the first core.

3. The electronic device of claim 2, wherein in the second core is further configured to generate the TLB check response based on the TLB check request, and wherein the TLB check predictor is further configured to:

increase the check weight value based on the TLB check response being generated based on occurrence of a TLB hit for the second TLB by the operation of looking up the second TLB by the second core; and decrease the check weight value based on the TLB check response being generated based on occurrence of a TLB miss for the second TLB by the operation of looking up the second TLB by the second core.

4. The electronic device of claim 3, wherein the TLB check predictor is further configured to:

transmit the TLB check request to the second core based on the check weight value being a reference value or greater; and not transmit the TLB check request to the second core based on the check weight value being less than the reference value.

5. The electronic device of claim 1, wherein the page table walker is further configured to stop the page table walk operation based on the TLB check response being generated based on occurrence of a TLB hit for the second TLB as the second core looks up the second TLB.

6. The electronic device of claim 1, wherein the process comprises at least one thread, and the at least one thread migrates from the second core to the first core.

7. The electronic device of claim 1, wherein the TLB check predictor is further configured to generate the TLB check request, based on the check weight table, based on a TLB miss for the first TLB occurring as the first core looks up the first TLB.

8. The electronic device of claim 1, further comprising:

a coherent interconnect electrically connecting the first core, the second core, and the main memory.

9. An operating method of an electronic device comprising a first core, a second core, and a main memory configured to execute processes, wherein the main memory comprises a page table, the first core comprises a first TLB configured to store a first portion of the page table, and the second core comprises a second TLB comprising a second portion of the page table, the operating method comprising:

looking up the first TLB, performed by the first core, based on a virtual address of a process;

looking up the page table, based on a result of the looking up the first TLB, by the first core;

performing an operation of looking up the second TLB, based on the result of the looking up the first TLB and a check weight table; and translating the virtual address into a physical address, based on a result of the looking up the page table and a TLB check response received from the second core, by the first core, wherein the check weight table comprises the virtual address and a check weight value corresponding to the virtual address.

10. The operating method of claim 9, wherein the performing the operation of looking up the second TLB comprises:

transmitting, by the first core, a TLB check request to the second core;

performing, by the second core, the operation of looking up the second TLB, based on the TLB check request; and transmitting, by the second core, the TLB check request comprising a result of the operation of looking up the second TLB to the first core.

11. The operating method of claim 10, wherein the performing the operation of looking up the second TLB comprises:

generating the TLB check request, based on the check weight table, based on a TLB miss for the first TLB occurring as the first core looks up the first TLB.

12. The operating method of claim 9, further comprising:

increasing the check weight value based on the TLB check response being generated based on occurrence of a TLB hit for the second TLB as the second core looks up the second TLB; and decreasing the check weight value based on the TLB check response being generated based on occurrence of a TLB miss for the second TLB as the second core looks up the second TLB.

13. The operating method of claim 9, wherein the performing the operation of looking up the second TLB comprises:

looking up the second TLB based on the check weight value being a reference value or greater.

14. The operating method of claim 9, wherein the looking up the page table comprises stopping the looking up the page table based on a TLB hit for the second TLB occurring as the second core looks up the second TLB.

* * * * *